US008678155B2

(12) United States Patent
Kawai et al.

(10) Patent No.: US 8,678,155 B2
(45) Date of Patent: Mar. 25, 2014

(54) CLUTCH UNIT

(75) Inventors: Masahiro Kawai, Iwata (JP); Hibi Yasumasa, Iwata (JP)

(73) Assignee: NTN Corporation, Osaka (JP)

( * ) Notice: Subject to any disclaimer, the term of this patent is extended or adjusted under 35 U.S.C. 154(b) by 545 days.

(21) Appl. No.: 12/919,246

(22) PCT Filed: Feb. 27, 2009

(86) PCT No.: PCT/JP2009/053674
§ 371 (c)(1),
(2), (4) Date: Aug. 25, 2010

(87) PCT Pub. No.: WO2009/110380
PCT Pub. Date: Sep. 11, 2009

(65) Prior Publication Data
US 2011/0005881 A1    Jan. 13, 2011

(30) Foreign Application Priority Data

Mar. 6, 2008 (JP) .................. 2008-056728
Mar. 6, 2008 (JP) .................. 2008-056753

(51) Int. Cl.
*F16D 23/00*    (2006.01)
(52) U.S. Cl.
USPC .......................................... 192/45
(58) Field of Classification Search
USPC ........................... 192/15, 19, 23.2
See application file for complete search history.

(56) References Cited

U.S. PATENT DOCUMENTS

| 3,305,057 A | 2/1967 | McAlpin et al. |
| 8,113,326 B2 * | 2/2012 | Kawai ............................ 192/15 |
| 8,132,658 B2 * | 3/2012 | Kawai et al. ............... 192/223.2 |
| 2002/0003074 A1 | 1/2002 | Kurita et al. |

(Continued)

FOREIGN PATENT DOCUMENTS

| EP | 1 270 977 | 1/2003 |
| EP | 1 308 643 | 5/2003 |

(Continued)

OTHER PUBLICATIONS

Supplementary European Search Report issued Oct. 19, 2012 in corresponding European Application No. 09717349.6.

(Continued)

*Primary Examiner* — David D. Le
*Assistant Examiner* — David J Hlavka
(74) *Attorney, Agent, or Firm* — Wenderoth, Lind, & Ponack, L.L.P.

(57) ABSTRACT

A clutch unit includes a lever-side clutch portion on an input side, and a brake-side clutch portion on the output side, in which the lever-side clutch portion includes a retainer for retaining a plurality of cylindrical rollers for controlling transmission/interruption of the torque input through engagement/disengagement between the lever-side outer race and an inner race transmitting the torque from the lever-side outer race to the brake-side clutch portion, and an inner centering spring including a lock portion to be locked to an end surface of the retainer, for accumulating an elastic force obtained by the torque input and for restoring the retainer to a neutral state by releasing the elastic force obtained by the torque input from the lever-side outer race and thus accumulated, and on the end surface of the retainer, a hook portion holds the lock portion of the inner centering spring in a protruding manner.

15 Claims, 31 Drawing Sheets

(56) References Cited

U.S. PATENT DOCUMENTS

| | | |
|---|---|---|
| 2003/0000796 A1 | 1/2003 | Kawai et al. |
| 2004/0099498 A1 | 5/2004 | Kurita et al. |
| 2007/0137978 A1* | 6/2007 | Yamada et al. ............ 192/223.2 |
| 2010/0122883 A1* | 5/2010 | Bartos et al. ................. 192/43.1 |

FOREIGN PATENT DOCUMENTS

| | | |
|---|---|---|
| JP | 62-051757 | 3/1987 |
| JP | 5-62749 | 8/1993 |
| JP | 10-019060 | 1/1998 |
| JP | 11-210764 | 8/1999 |
| JP | 2003-166555 | 6/2003 |
| JP | 2006-083983 | 3/2006 |

OTHER PUBLICATIONS

International Search Report issued May 12, 2009 in International (PCT) Application No. PCT/JP2009/053674.

International Preliminary Report on Patentability and Written Opinion of the International Searching Authority issued Oct. 21, 2010 in International (PCT) Application No. PCT/JP2009/053674.

* cited by examiner

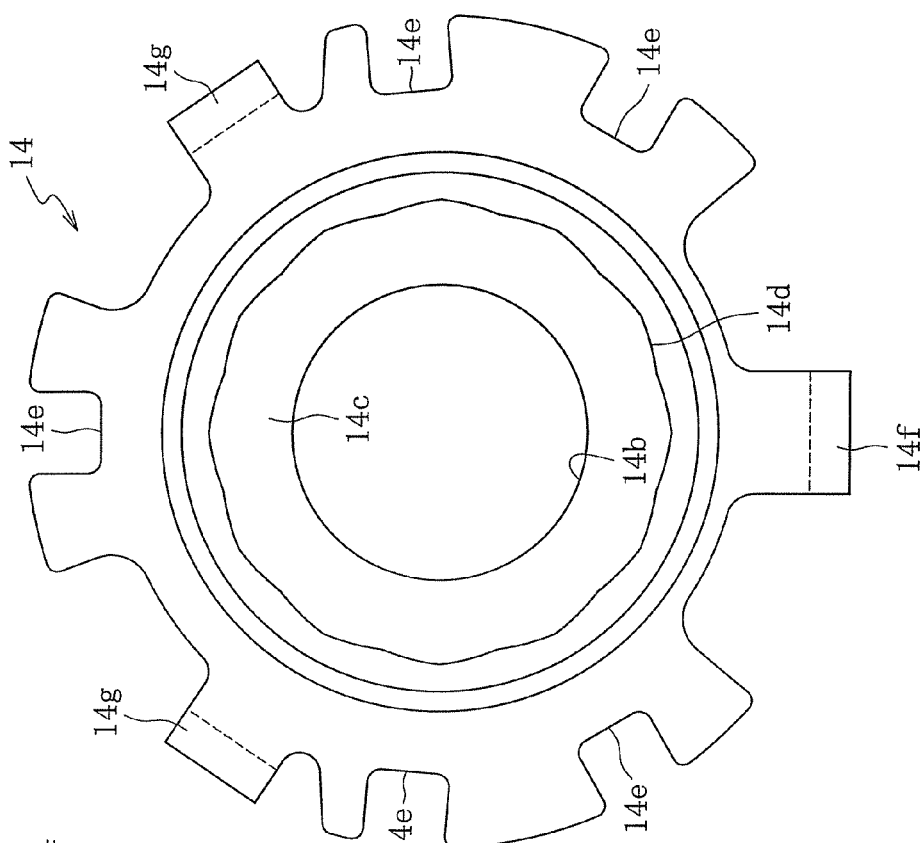
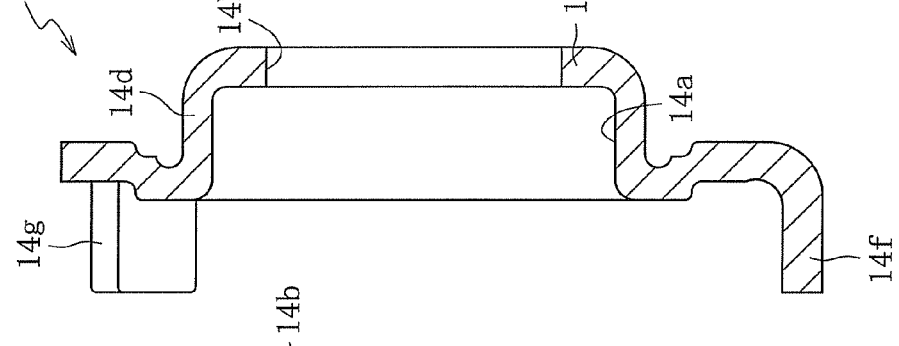
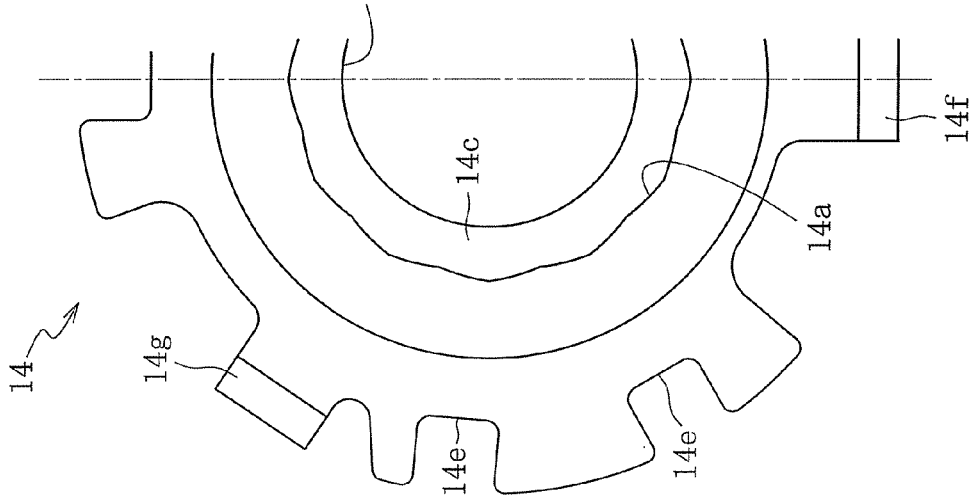

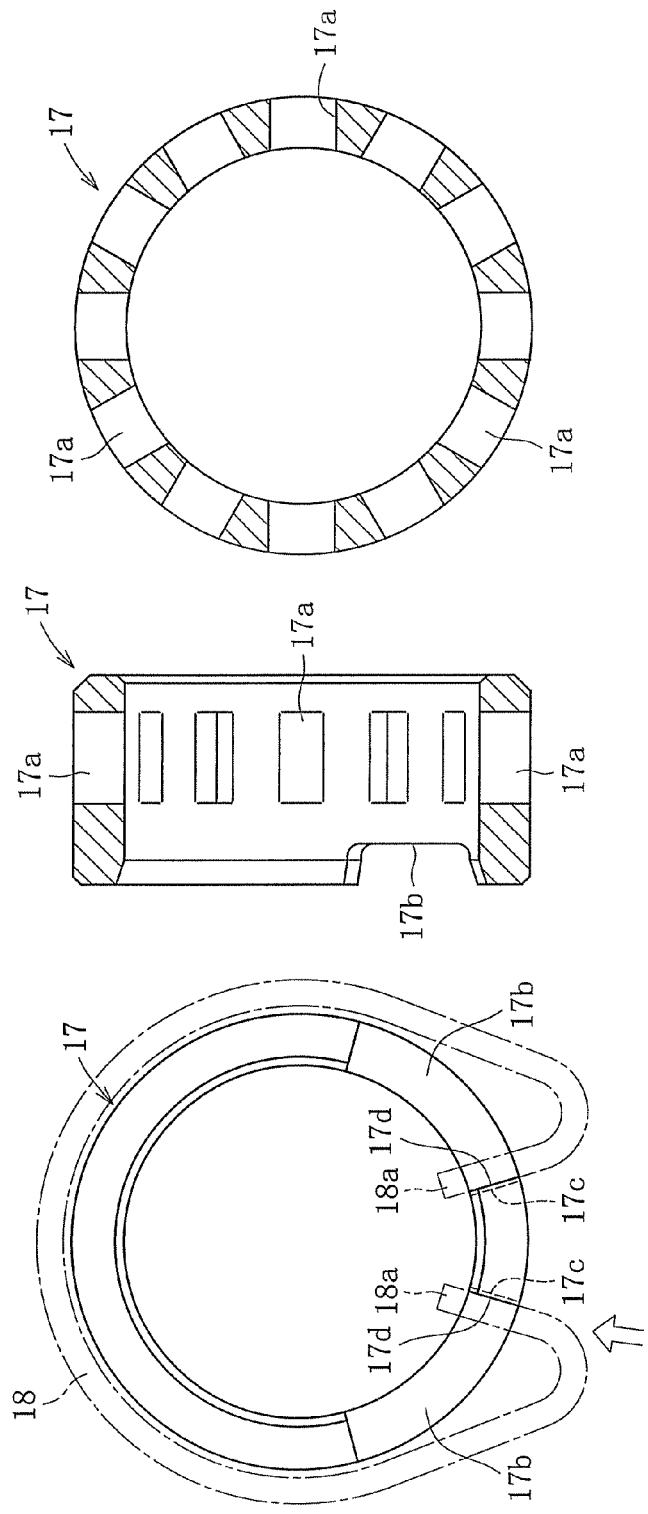

Fig. 11a
Fig. 11b
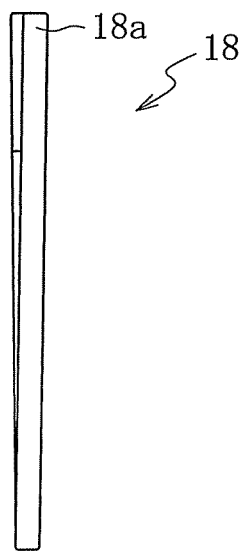
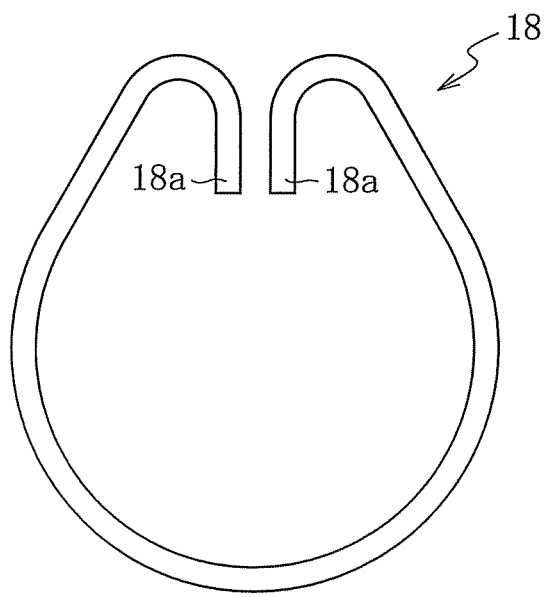

Fig. 16b
Fig. 16a
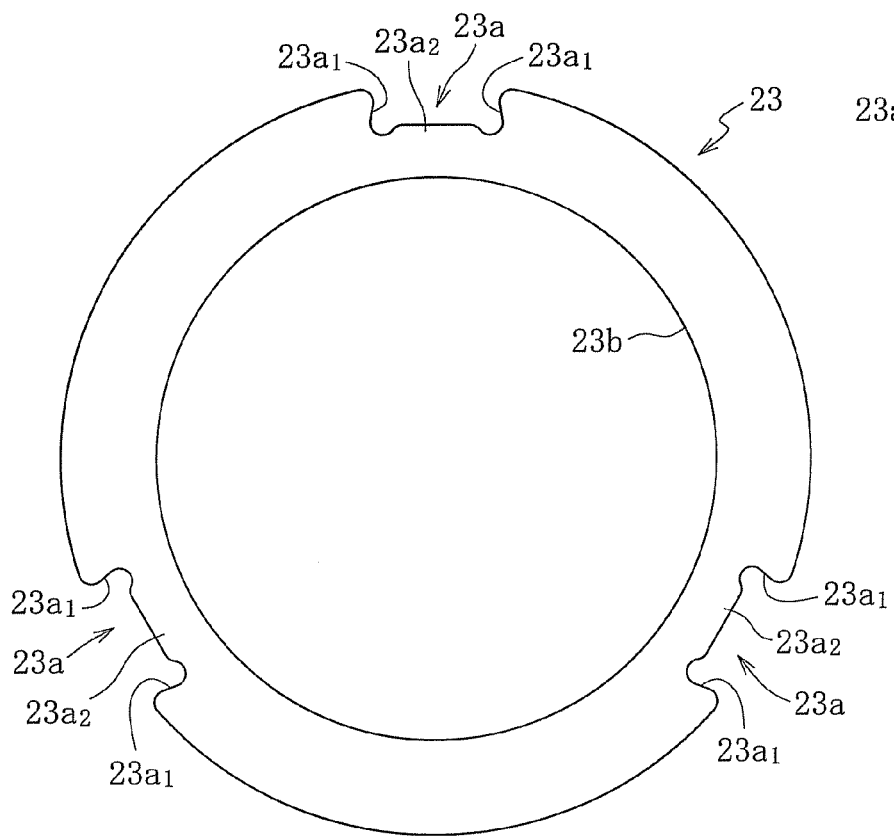
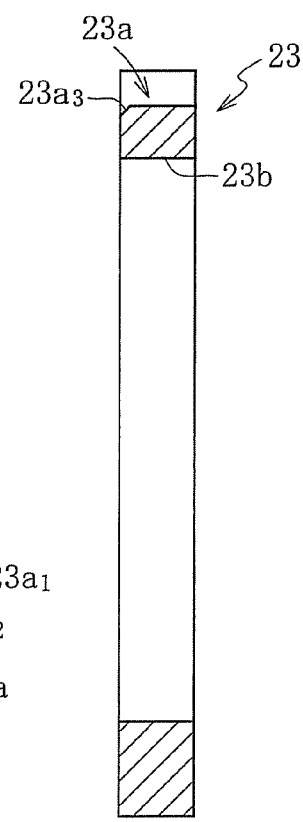
Fig. 16c
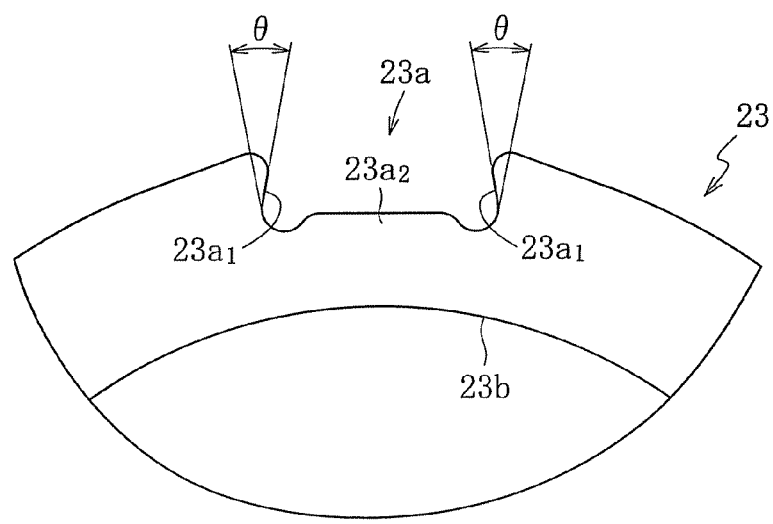

Fig. 18a
Fig. 18b
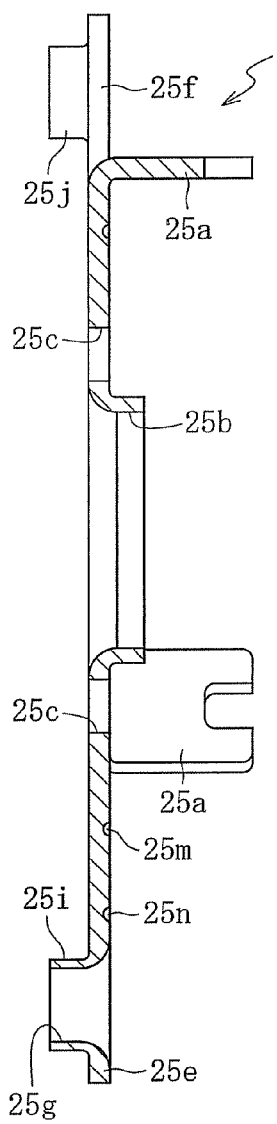
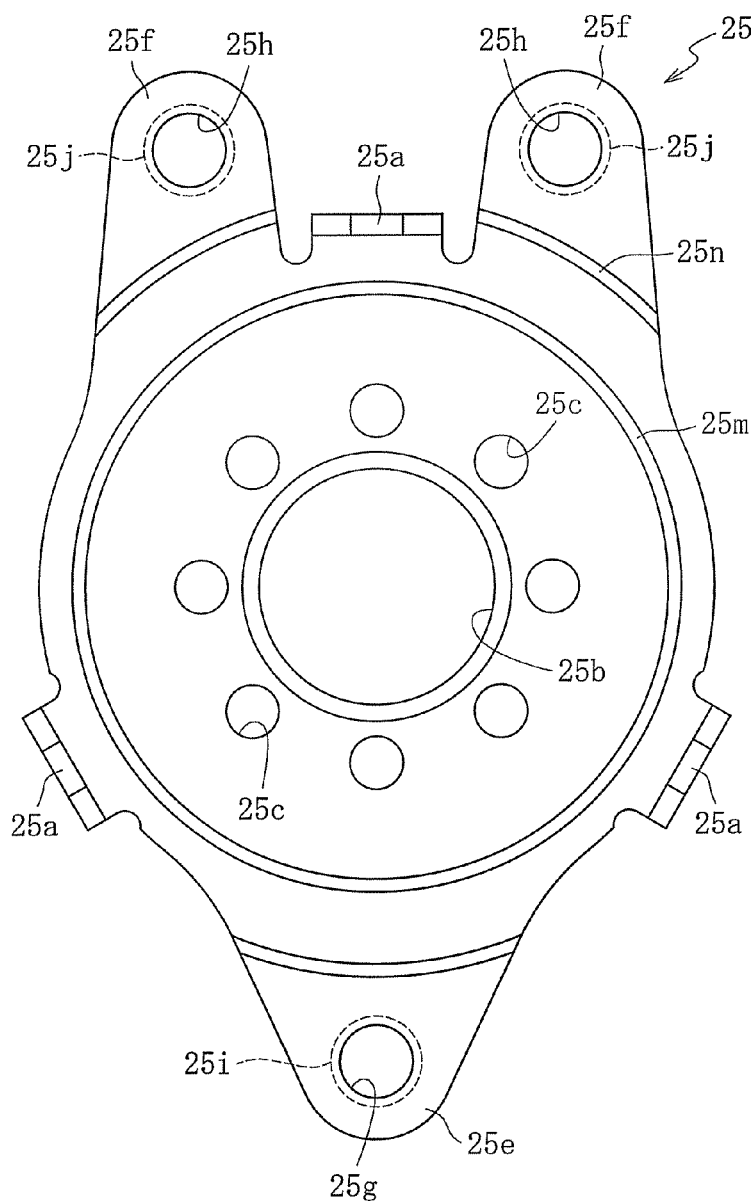

CLUTCH UNIT

BACKGROUND OF THE INVENTION

I. Technical Field

The present invention relates to a clutch unit having a lever-side clutch portion transmitting rotational torque from an input side to an output side thereof and a brake-side clutch portion transmitting rotational torque from the input side to the output side and interrupting torque reverse-input from the output side.

II. Description of the Related Art

Generally speaking, in a clutch unit using engagement elements such as cylindrical rollers or balls, a clutch portion is arranged between an input-side member and an output-side member. Further, in the clutch portion, the engagement elements such as cylindrical rollers or balls are engaged/disengaged with respect to wedge gaps formed between the input-side member and the output-side member, thereby controlling transmission/interruption of the input torque.

A clutch unit of this type is incorporated into, for example, an automobile seat-lifter section for which vertically moves a seat with lever operation. This clutch unit is provided with a lever-side clutch portion transmitting rotational torque from the input side to the output side and a brake-side clutch portion transmitting rotational torque from the input side to the output side and interrupting torque reverse-input from the output side (see, for example, JP 2003-166555 A).

FIG. 30 is a longitudinal sectional view of an overall structure of the conventional clutch unit disclosed in JP 2003-166555 A, FIG. 31 is a sectional view taken along the line D-D of FIG. 30, and FIG. 32 is a sectional view taken along the line E-E of FIG. 30.

As illustrated in FIGS. 30 and 31, a lever-side clutch portion 111 mainly includes a lever-side outer race 114 serving as an input-side member to which torque is input with lever operation, an inner race 115 serving as a coupling member for transmitting the torque from the lever-side outer race 114 to a brake-side clutch portion 112, a plurality of cylindrical rollers 116 serving as engagement elements controlling transmission/interruption of the torque input from the lever-side outer race 114 through engagement/disengagement between the lever-side outer race 114 and the inner race 115, a retainer 117 retaining the cylindrical rollers 116 at predetermined circumferential intervals, a brake-side outer race 123 serving as a stationary-side member restricted in rotation, an inner centering spring 118 serving as a first elastic member which is provided between the retainer 117 and the brake-side outer race 123, for accumulating an elastic force obtained by the torque input from the lever-side outer race 114 and restoring the retainer 117 to a neutral state by releasing the elastic force obtained by the torque input from the lever-side outer race 114 and thus accumulated, and an outer centering spring 119 serving as a second elastic member which is provided between the lever-side outer race 114 and the brake-side outer race 123 and accumulates an elastic force with torque input from the lever-side outer race 114, restoring the lever-side outer race 114 to the neutral state with the accumulated the elastic force through releasing of the input torque.

Note that, in the drawings, reference numeral 113 indicates a lever-side side plate fixed to the lever-side outer race 114 by swaging and constituting the input-side member together with the lever-side outer race 114, and reference numeral 130 denotes a washer mounted to an output shaft 122 through the intermediation of a wave washer 131.

Meanwhile, as illustrated in FIGS. 30 and 32, the brake-side clutch portion 112 mainly includes the brake-side outer race 123 serving as a stationary-side member restricted in rotation, the inner race 115 serving as a coupling member to which torque from the lever-side clutch portion 111 is input, and a plurality of pairs of cylindrical rollers 127 serving as engagement elements arranged in a gap between the brake-side outer race 123 and the output shaft 122, for controlling transmission of torque input from the inner race 115 and interrupting torque reverse-input from the output shaft 122 through engagement/disengagement between the brake-side outer race 123 and the output shaft 122.

Note that, a larger diameter portion 115c obtained by enlarging an axial end portion of the inner race 115 functions as a retainer retaining the cylindrical rollers 127 at predetermined circumferential intervals. In the drawings, reference numeral 125 denotes a brake-side side plate fixed to the brake-side outer race 123 by swaging and constituting the stationary-side member together with the brake-side outer race 123, reference numeral 128 denotes a plate spring of, for example, an N-shaped sectional configuration arranged between the cylindrical rollers 127 of each pair, and reference numeral 129 denotes a friction ring serving as a brake member mounted to the brake-side side plate 125.

Patent Literature 1: JP 2003-166555 A

SUMMARY OF THE INVENTION

Incidentally, the lever-side clutch portion 111 in the conventional clutch unit disclosed in JP 2003-166555 A includes: the lever-side outer race 114 to which torque is input with lever operation; the inner race 115 transmitting the torque input from the lever-side outer race 114 to the brake-side clutch portion 112; the plurality of cylindrical rollers 116 for controlling transmission/interruption of the torque input from the lever-side outer race 114 through engagement/disengagement between the lever-side outer race 114 and the inner race 115; the retainer 117 for retaining the plurality of cylindrical rollers 116 at predetermined intervals in a circumferential direction; and the inner centering spring 118 (refer to FIG. 30) provided between the retainer 117 and the brake-side outer race 123, for accumulating an elastic force obtained by the torque input from the lever-side outer race 114 and restoring the retainer 117 to a neutral state by releasing the elastic force obtained by the torque input from the lever-side outer race 114 and thus accumulated (refer to FIGS. 2 and 3 of JP 2003-166555 A).

The inner centering spring 118 disclosed in JP 2003-166555 A is a C-shaped spring member having a tie-plate shape. In view of achieving compactification through reducing an axial dimension of the clutch unit, it is preferred that a cross-sectional shape of the inner centering spring 118 be a circular shape. FIGS. 33 and 34a to 34d illustrate the retainer 117 in a case where the cross-sectional shape of the inner centering spring 118 is a circular shape.

The retainer 117 is a cylindrical member in which a plurality of pockets 117a for accommodating the cylindrical rollers 116 are equiangularly formed. The inner centering spring 118 is a C-shaped spring member having a circular shape in cross-section and including a pair of lock portions 118a bent to a radially inner side (refer to FIG. 34b). Two cutout recessed portions 117b are formed in one end portion of the retainer 117, and the lock portions 118a of the inner centering spring 118 are locked to adjacent two end surfaces 117c of the respective cutout recessed portions 117b.

At the time of application of torque input from the lever-side outer race 114 in the inner centering spring 118, one of the lock portions 118a is engaged with one of the end surfaces 117c of the retainer 117, and the other of the lock portions 118a is engaged with a claw portion (not shown) of the brake-side outer race 123. Thus, the inner centering spring 118 is extended in accordance with rotation of the lever-side outer race 114 so as to accumulate an elastic force. At the time of releasing the torque input from the lever-side outer race 114, the retainer 117 is restored to a neutral state with the elastic restoring force.

Here, in the retainer 117 disclosed in JP 2003-166555 A, the end surfaces 117c to which the lock portions 118a of the inner centering spring 118 are locked are each formed into a straight shape extending along the axial direction. However, in the case of considering incorporating performance of the inner centering spring 118, it is preferred that chamfered portions 117d be respectively formed at distal ends of the end surfaces 117c as illustrated in FIGS. 33, 34a, and 34b. When the chamfered portions 117d are respectively formed at the distal ends of the end surfaces 117c of the retainer 117 in this way, it is easy to perform an assembly work in which the lock portions 118a of the inner centering spring 118 are inserted into the cutout recessed portions 117b of the retainer 117 from the axial direction to be brought into contact with the end surfaces 117c.

However, the inner centering spring 118 is assembled between the retainer 117 and the brake-side outer race 123 as described above, and, because of its assembly tolerance, the retainer 117 may be moved in the axial direction to be away from the brake-side outer race 123. In this case, the inner centering spring 118 tends to enter the gap between the retainer 117 and the brake-side outer race 123. As a result, distal edge portions of the end surfaces 117c of the retainer 117 are abraded, and hence the lock portions 118a of the inner centering spring 118 are easily detached from the end surfaces 117c of the retainer 117.

This phenomenon significantly occurs as illustrated by an arrow of FIG. 34d in a structure in which the chamfered portions 117d are formed at the distal ends of the end surfaces 117c of the retainer 117. When the lock portions 118a of the inner centering spring 118 are detached from the end surfaces 117c of the retainer 117, the inner centering spring 118 enters the gap between the retainer 117 and the brake-side outer race 123. As a result, there is a risk in that it is difficult to cause the inner centering spring 118 to exert its function.

Therefore, it is an object of the present invention to provide a clutch unit capable of preventing the inner centering spring from being detached from the retainer and of causing the inner centering spring to reliably exert its function.

A clutch unit according to the present invention includes: a lever-side clutch portion provided on an input side, for controlling transmission/interruption of rotational torque to an output side with lever operation; a brake-side clutch portion provided on an output side, for transmitting torque input from the lever-side clutch portion to the output side and for interrupting torque reverse-input from the output side, in which: the lever-side clutch portion includes: an input-side member to which torque is input with the lever operation; a coupling member for transmitting the torque input from the input-side member to the brake-side clutch portion; a plurality of engagement elements for controlling transmission/interruption of the torque input from the input-side member through engagement/disengagement between the input-side member and the coupling member; a retainer for retaining the plurality of engagement elements at predetermined intervals in a circumferential direction; and an elastic member including a lock portion to be locked to an end surface of the retainer, for accumulating an elastic force obtained by the torque input from the input-side member and for restoring the retainer to a neutral state by releasing the elastic force obtained by the torque input from the input-side member and thus accumulated.

As technical means for achieving the above-mentioned object, the clutch unit according to the present invention is characterized in that, on the end surface of the retainer to which the lock portion of the elastic member is locked, a hook portion for holding the lock portion of the elastic member is provided in a protruding manner.

According to the present invention, the hook portion for holding the lock portion of the elastic member is provided in the protruding manner on the end surface of the retainer to which the lock portion of the elastic member is locked. Thus, even when the lock portion of the elastic member is likely to be detached from the end surface of the retainer, it is possible to inhibit the detachment of the lock portion by the hook portion. As a result, it is easy to maintain a state in which the lock portion of the elastic member is locked to the end surface of the retainer, and hence it is possible to cause the elastic member to reliably exert its function.

In a case where the elastic member includes a spring member having a circular shape in cross-section, it is preferred that the end surface of the retainer to be held in contact with the lock portion of the elastic member be formed into an arc-shape in cross-section. In this way, the end surface of the retainer is formed into the arc-shape in cross-section conforming to a contour shape of the lock portion of the elastic member. Thus, it is possible to stabilize an abutting state in which the lock portion of the elastic member is held in contact with the end surface of the retainer, and it is further easy to maintain the state.

Further, it is desired that a protruding dimension of the hook portion provided in the protruding manner on the end surface of the retainer be set to $1/6$ to $1/3$ of a wire material diameter of the elastic member (outer diameter in a case where the elastic member has a circular shape in cross-section). With this configuration, it is possible to reliably inhibit the lock portion of the elastic member from being detached from the end surface of the retainer. In addition, it is easy to insert the lock portion of the elastic member in the end surface of the retainer across the hook portion from the axial direction when assembling the elastic member to the retainer.

Note that, when the protruding dimension of the hook portion is smaller than $1/6$ of the wire material diameter of the elastic member, the lock portion of the elastic member tends to be detached from the end surface of the retainer. On the other hand, when the protruding dimension is larger than $1/3$ thereof, it is difficult to insert the lock portion of the elastic member in the end surface of the retainer across the hook portion from the axial direction when assembling the elastic member to the retainer.

Further, it is preferred that a chamfered portion be formed at a protruding end of the hook portion provided in the protruding manner on the end surface of the retainer. With this configuration, the lock portion can be easily inserted across the hook portion when assembling the elastic member to the retainer, and hence it is further easy to insert the lock portion of the elastic member in the end surface of the retainer from the axial direction.

In the clutch unit according to the present invention, the brake-side clutch portion may include: a coupling member to which the torque from the lever-side clutch portion is input; and an output-side member rotatably arranged inside the coupling member, and the coupling member may include: a bottomed cylindrical portion in which a shaft portion of the output-side member is inserted and arranged; and a hole which is formed by punching with a press in a bottom portion of the bottomed cylindrical portion and through which the shaft portion of the output-side member is rotatably inserted.

The coupling member according to the present invention includes: the bottomed cylindrical portion in which the shaft portion of the output-side member is inserted and arranged; and the hole which is formed by punching with a press in the bottom portion of the bottomed cylindrical portion and through which the shaft portion of the output-side member is rotatably inserted. Thus, cutting as in the conventional case is not required in manufacturing the coupling member. Therefore, it is possible to achieve cost reduction in manufacturing the coupling member.

Further, in the clutch unit according to the present invention, the coupling member may include a chamfered portion formed on an inner peripheral edge portion of the hole formed in the bottom portion of the bottomed cylindrical portion. With this configuration, the chamfered portion formed on the inner peripheral edge portion of the hole serves as a guide surface when the shaft portion of the output-side member is inserted through the hole. As a result, it is easy to insert the shaft portion of the output-side member into the hole, and it is possible to improve assembly performance between the coupling member and the output-side member.

Further, in the clutch unit according to the present invention, an inner diameter dimension of the bottomed cylindrical portion of the coupling member may be set to be larger than an outer diameter dimension of the shaft portion of the output-side member. With this configuration, it is possible to form a gap between an inner periphery of the bottomed cylindrical portion and an outer periphery of the shaft portion of the output-side member. Even if a protrusion caused by denting exists on an outer peripheral surface of the shaft portion, it is possible to insert the shaft portion into the bottomed cylindrical portion, to thereby improve assembly performance between the coupling member and the output-side member.

In the clutch unit according to the present invention, the lever-side clutch portion may include: an input-side member to which torque is input with the lever operation; a coupling member for transmitting the torque input from the input-side member to the brake-side clutch portion; a plurality of engagement elements for controlling transmission/interruption of the torque input from the input-side member through engagement/disengagement between the input-side member and the coupling member; a retainer for retaining the engagement elements at predetermined intervals in a circumferential direction; a stationary-side member restricted in rotation; a first elastic member provided between the retainer and the stationary-side member, for accumulating an elastic force obtained by the torque input from the input-side member and restoring the retainer to a neutral state by releasing the elastic force obtained by the torque input from the input-side member and thus accumulated; and a second elastic member provided between the input-side member and the stationary-side member, for accumulating the elastic force with the torque input from the input-side member and restoring the input-side member to the neutral state by releasing the elastic force obtained by the torque input from the input-side member and thus accumulated. Note that, it is desired that the engagement elements of the lever-side clutch portion include cylindrical rollers.

In the clutch unit according to the present invention, the brake-side clutch portion may include: a coupling member to which torque input from the lever-side clutch portion is input; an output-side member from which the torque is output; a stationary-side member restricted in rotation; and a plurality of pairs of engagement elements arranged in wedge gaps between the stationary-side member and the output-side member, for controlling transmission of the torque input from the coupling member and interrupting the torque reverse-input from the output-side member through engagement/disengagement between the stationary-side member and the output-side member. Note that, it is desired that the engagement elements of the brake-side clutch portion include cylindrical rollers.

In the clutch unit according to the present invention, the lever-side clutch portion and the brake-side clutch portion are incorporated in an automobile seat-lifter section. Thus, the clutch unit is suited for use in an automobile. In this case, the clutch unit has a configuration in which the input-side member is connected to the operation lever and an output-side member is coupled to a link mechanism of the automobile seat-lifter section.

According to the present invention, the hook portion for holding the lock portion of the elastic member is provided in the protruding manner on the end surface of the retainer to which the lock portion of the elastic member is locked. Thus, even when the lock portion of the elastic member seems to be detached from the end surface of the retainer, it is possible to inhibit detachment of the lock portion by the hook portion. As a result, it is easy to maintain the state in which the lock portion of the elastic member is locked to the end surface of the retainer, and hence it is possible to cause the elastic member to reliably exert its function. Therefore, it is possible to provide a clutch unit with high reliability.

BRIEF DESCRIPTION OF THE DRAWINGS

FIG. 6b is a left-hand side view of FIG. 6a.
FIG. 7a is a sectional view of a lever-side outer race.
FIG. 7b is a left-part side view of FIG. 7a.
FIG. 7c is a right-hand side view of FIG. 7a.
FIG. 8b is a left-hand side view of FIG. 8a.
FIG. 10a is a sectional view of the retainer.
FIG. 10b is a left-hand side view of FIG. 10a.
FIG. 10c is a sectional view of FIG. 10a.
FIG. 10d is a enlarged view seen from the outline arrow of FIG. 10b.
FIG. 10e is a enlarged view of a modification of FIG. 10d.
FIG. 11a is a front view of an inner centering spring.
FIG. 11b is a right-hand side view of FIG. 11a.
FIG. 12b is a partially enlarged bottom view of FIG. 12a.
FIG. 14b is a left-hand side view of FIG. 14a.
FIG. 14c is a right-hand side view of FIG. 14a.
FIG. 15b is a front view of FIG. 15a.

FIG. 15c is a left-hand side view of FIG. 15a.

FIG. 16a is a sectional view of a brake-side outer race.

FIG. 16b is a left-hand side view of FIG. 16a.

FIG. 16c is a partially enlarged view of one of cutout recessed portions of FIG. 16b.

FIG. 17b is a left-hand side view of FIG. 17a.

FIG. 18a is a sectional view of a brake-side side plate.

FIG. 18b is a right-hand side view of FIG. 18a.

FIG. 19b is a left-hand side view of FIG. 19a.

FIG. 19c is a right-hand side view of FIG. 19a.

FIG. 27b is an enlarged view of a main part of FIG. 27a.

FIG. 34b is a left-hand side view of FIG. 34a.

FIG. 34c is a sectional view of FIG. 34a.

DETAILED DESCRIPTION OF THE INVENTION

Figure 1:
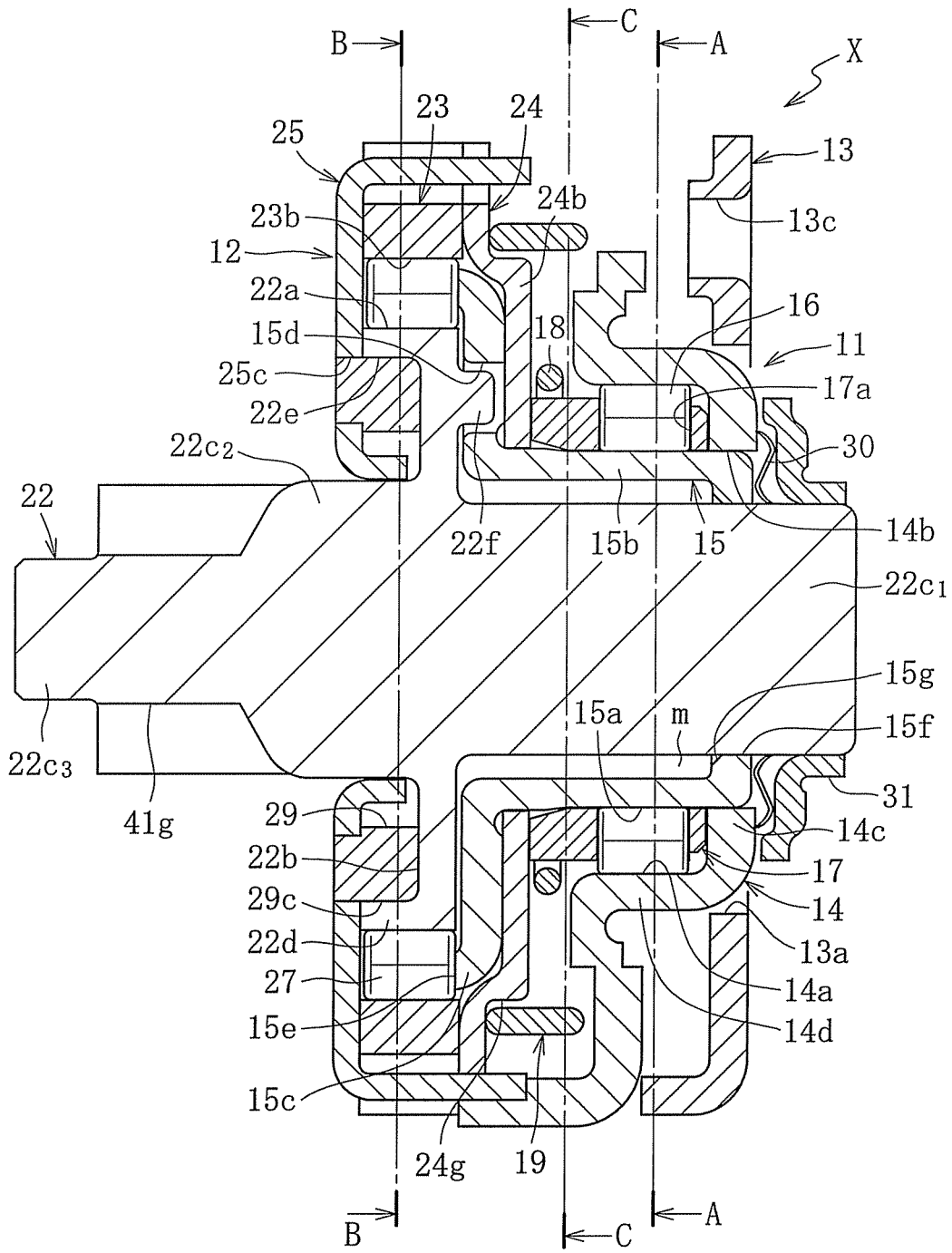
FIG. 1 is a longitudinal sectional view of an overall structure of a clutch unit according to an embodiment of the present invention.
Figure 2:
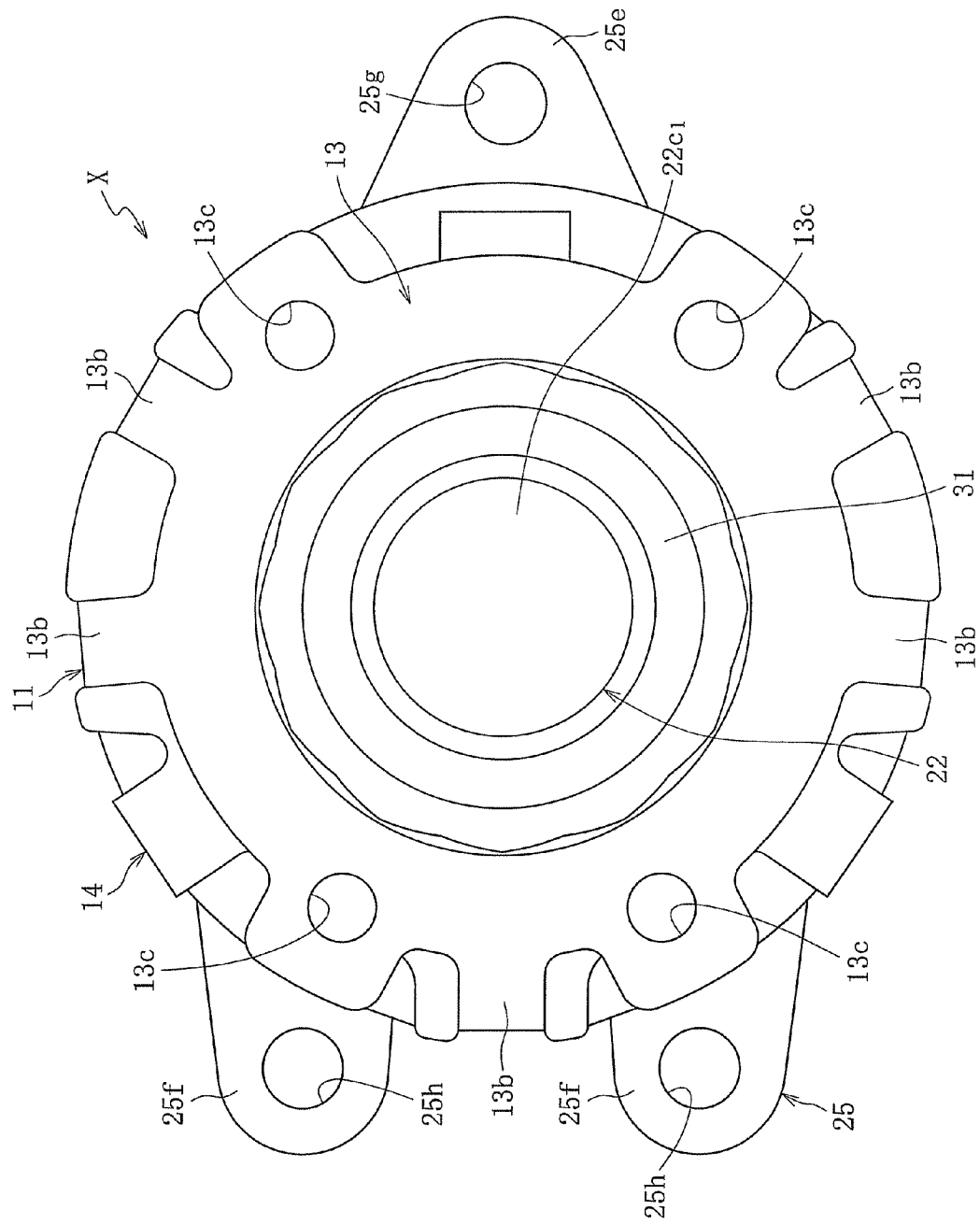
FIG. 2 is a right-hand side view of FIG. 1.
Figure 3:
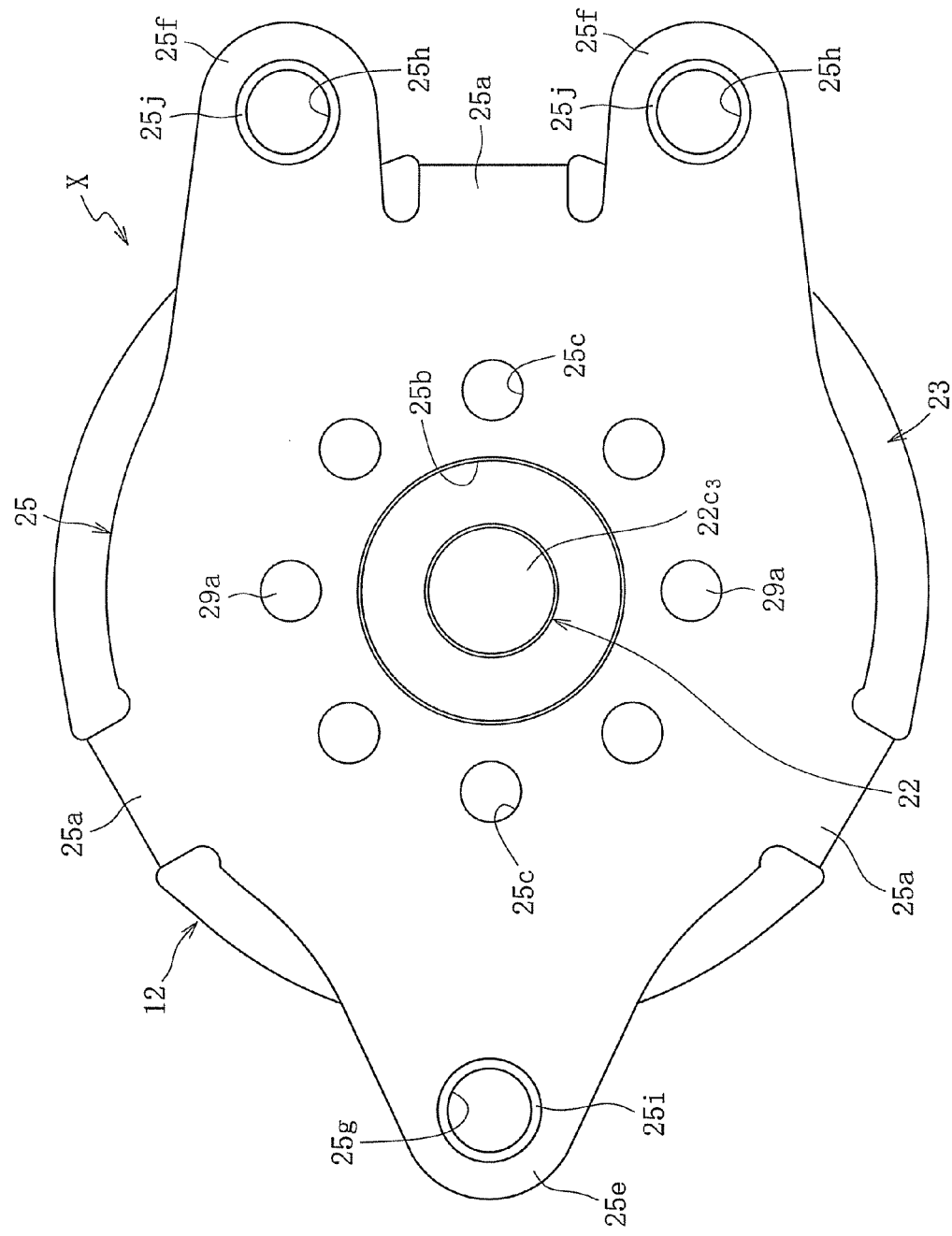
FIG. 3 is a left-hand side view of FIG. 1.
Figure 4:
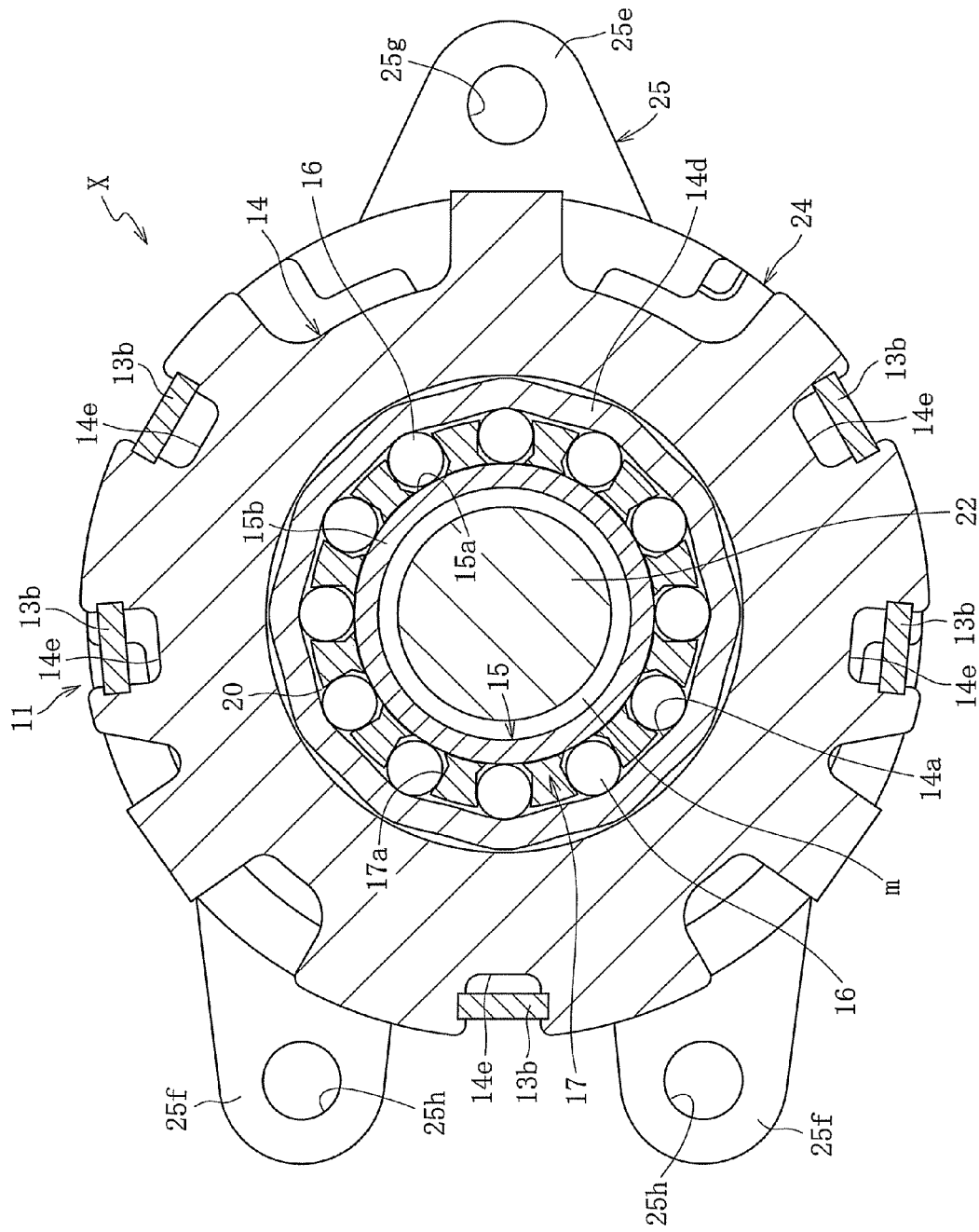
FIG. 4 is a sectional view taken along the line A-A of FIG. 1.
Figure 5:
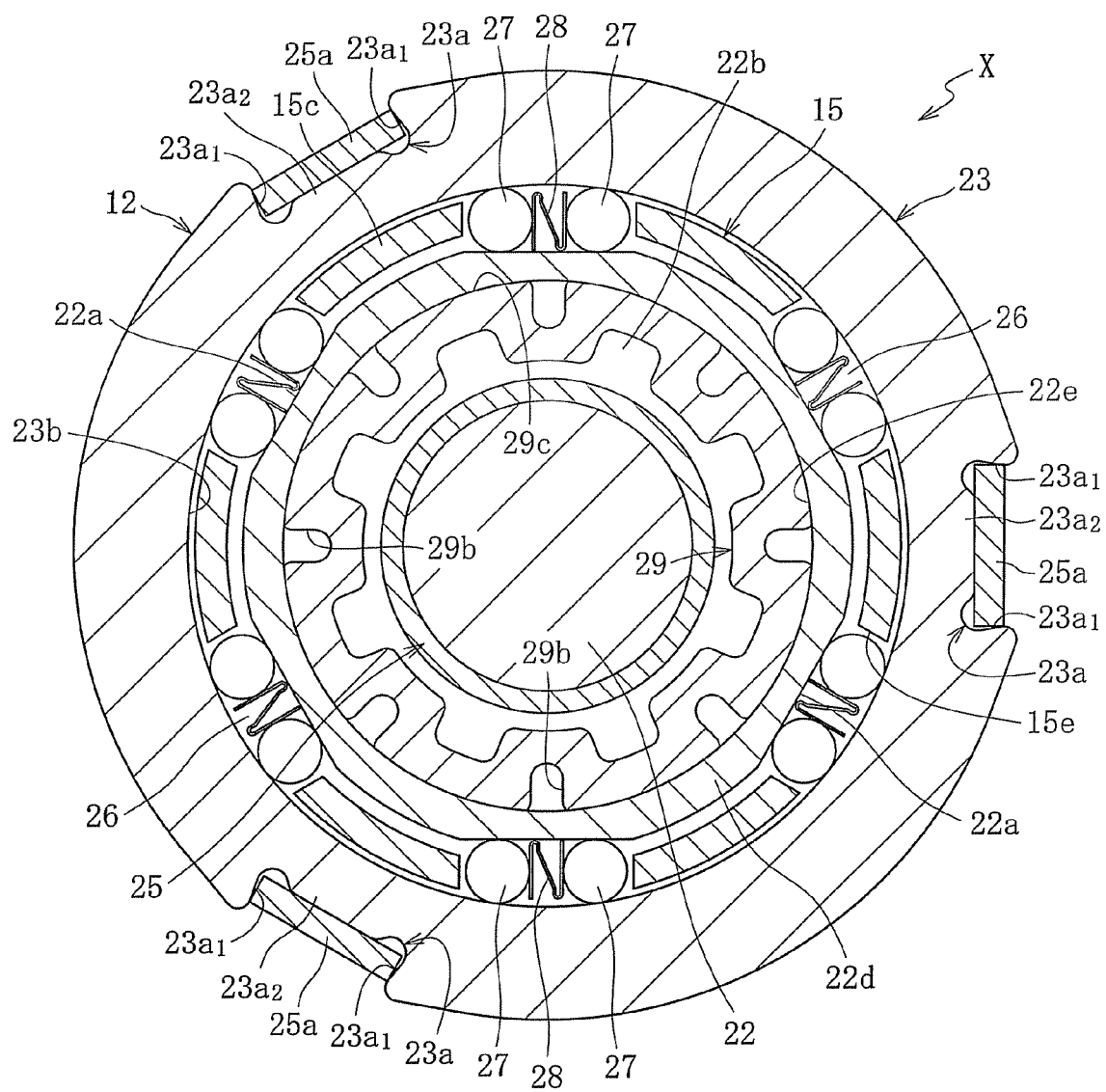
FIG. 5 is a sectional view taken along the line B-B of FIG. 1.

FIG. 1 is a longitudinal sectional view of an overall structure of a clutch unit X according to an embodiment of the present invention. FIG. 2 is a right-hand side view of the clutch unit X illustrated in FIG. 1. FIG. 3 is a left-hand side view of the clutch unit X illustrated in FIG. 1. FIG. 4 is a lateral sectional view taken along the line A-A of FIG. 1. FIG. 5 is a lateral sectional view taken along the line B-B of FIG. 1. Further, FIGS. 6 to 19 illustrate main components of the clutch unit X. FIGS. 20 to 25 illustrate assembled states of the main components of the clutch unit X.

The clutch unit X is incorporated into an automobile seat-lifter section (refer to FIGS. 26, 27a, and 27b) for adjusting the height of a seat with a lever operation or the like. As illustrated in FIGS. 1 to 5, the clutch unit X is constituted by a lever-side clutch portion 11 provided on an input side and a brake-side clutch portion 12 which is provided on an output side and which has a function of interrupting reverse input.

As illustrated in FIGS. 1, 2, and 4, the lever-side clutch portion 11 includes a lever-side side plate 13 and a lever-side outer race 14 which serve as an input-side member to which an operation lever (not shown) or the like is connected, an inner race 15 serving as a coupling member which transmits torque from the lever-side outer race 14 to the brake-side clutch portion 12, a plurality of cylindrical rollers 16 arranged as engagement elements in wedge gaps 20 formed between an outer peripheral surface of the inner race 15 and an inner peripheral surface of the lever-side outer race 14, a retainer 17 for retaining the cylindrical rollers 16 equiangularly formed, an inner centering spring 18 as a first elastic member for restoring the retainer 17 to a neutral state, and an outer centering spring 19 as a second elastic member for restoring the lever-side outer race 14 to a neutral state. Note that, components are prevented from being detached by press-fitting a washer 31 onto an end portion of an output shaft 22 described later through intermediation of a wave washer 30 (refer to FIG. 1).

As illustrated in FIGS. 1, 3, and 5, the so-called lock type brake-side clutch portion 12 which has a function of interrupting reverse input mainly includes the inner race 15 serving as a coupling member to which the torque from the lever-side clutch portion 11 is input, an output shaft 22 serving as an output-side member, a brake-side outer race 23, a cover 24, and the brake-side side plate 25 serving as the stationary-side member restricted in rotation, a plurality of pairs of cylindrical rollers 27 arranged as coupling members in wedge gaps 26 between the brake-side outer race 23 and the output shaft 22, for controlling transmission of the torque input from the inner race 15 and interrupting torque reverse-input from the output shaft 22 through engagement/disengagement between both members, and plate springs 28 of, for example, an N-shaped sectional configuration, each provided between the cylindrical rollers 27 of each pair and serving as elastic members imparting repulsive force to the cylindrical rollers 27. Note that, protrusions 22f are provided to the output shaft 22 and inserted into holes 15d with clearances, the holes 15d being provided to the inner race 15 (refer to FIG. 1).

Next, detailed description is made of main components of the lever-side clutch portion 11 and the brake-side clutch portion 12 which are provided in the clutch unit X.

Figure 6A:
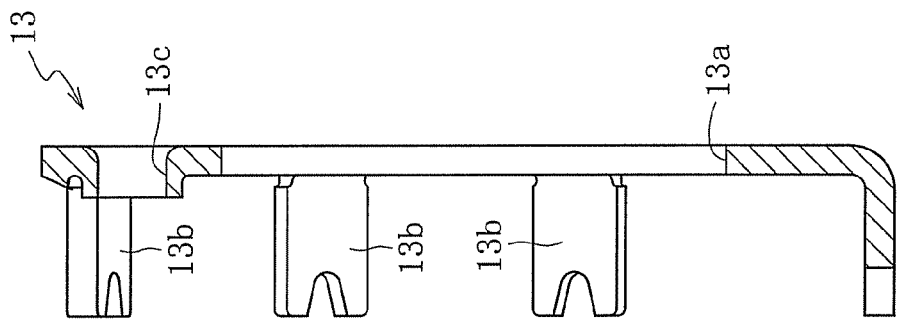
FIG. 6a is a sectional view of a lever-side side plate.
Figure 6B:
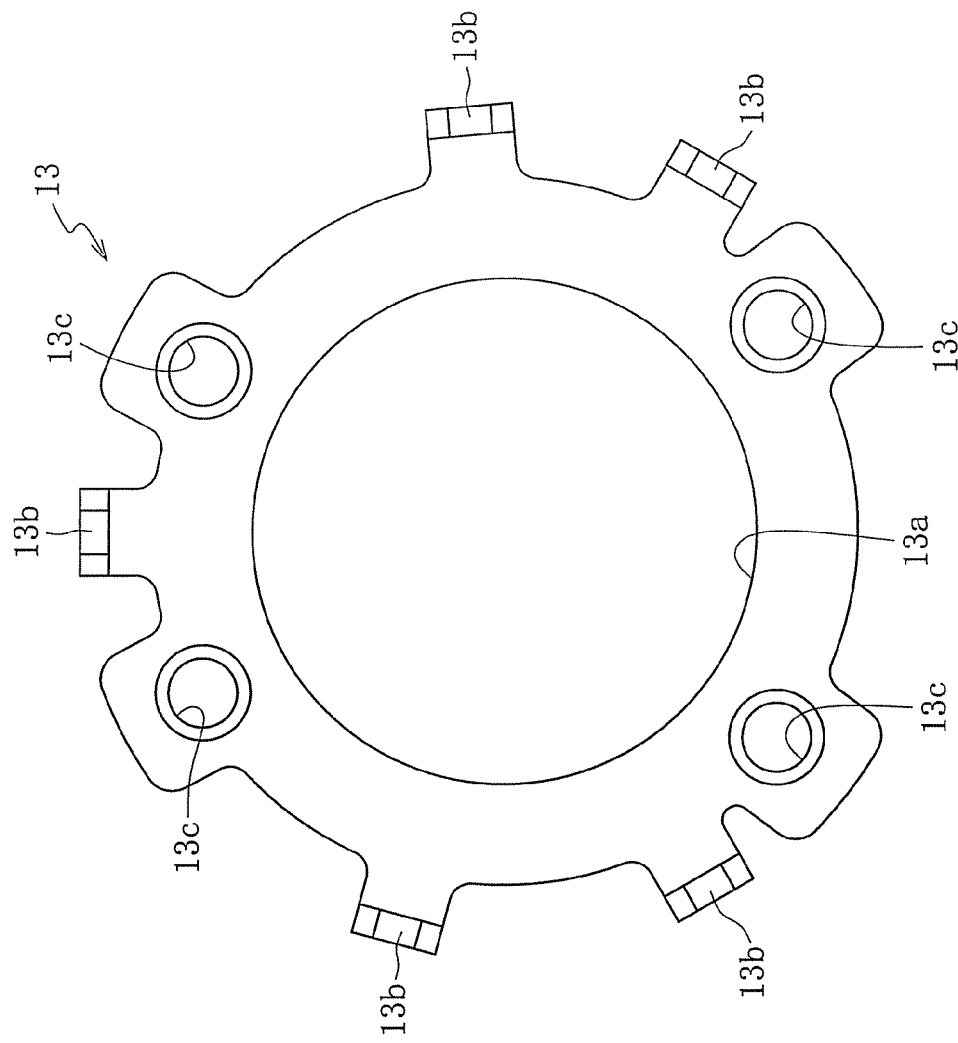

FIGS. 6a and 6b illustrate the lever-side side plate 13 of the lever-side clutch portion 11. In the lever-side side plate 13, a hole 13a into which the output shaft 22 and the inner race 15 are inserted is formed in a center portion thereof, and a plurality of (five, for example) claw portions 13b are provided in a protruding manner on an outer peripheral portion thereof. Those claw portions 13b are bent and molded in an axial direction so as to have bisected distal ends. Then, the claw portions 13b are inserted into cutout recessed portions 14e (refer to FIG. 7c) of the lever-side outer race 14, the cutout recessed portions 14e being described later. Lastly, the distance between each of the bisected distal ends is increased outward. In this manner, the lever-side side plate 13 is fixed to the lever-side outer race 14 by swaging. Note that, in the figures, a plurality of (four, for example) holes are represented by reference symbol 13c, the holes allowing the operation lever (not shown) for adjusting height of a seat to be attached to the lever-side side plate 13.

FIGS. 7a to 7c illustrate the lever-side outer race 14. The lever-side outer race 14 is obtained by molding a plate-like material into a cup-shape through press working, and includes a hole 14b which is formed in a center portion 14c through which the output shaft 22 and the inner race 15 are inserted. On an inner periphery of a cylindrical portion 14d extending from the center portion 14c in the axial direction, a plurality of cam surfaces 14a are equiangularly formed (refer to FIG. 4).

On an outer peripheral portion of the lever-side outer race 14, a plurality of (three, for example) claw portions 14f and 14g are provided in a protruding manner and bent and molded in the axial direction. Of those claw portions 14f and 14g, the one claw portion 14f is locked by being inserted and arranged between two lock portions 19a (refer to FIG. 12a) of an outer centering spring 19 described later. In a state of being in contact with an end surface of a brake-side outer race 23 (refer to FIG. 16b) described later, the other two claw portions 14g slide on the end surface of the brake-side outer race 23 in accordance with rotation of the lever-side outer race 14, and are allowed to be brought into contact, in a rotational direction, with two lock portions 24e and 24f (refer to FIG. 17b) provided on an outer periphery of the cover 24 and serving as rotation stoppers. In this manner, an operating angle of the operation lever is regulated.

Further, the plurality of (five in the figure) cutout recessed portions 14e into which the claw portions 13b (refer to FIGS. 6a and 6b) of the lever-side side plate 13 are inserted are formed on an outer periphery of the lever-side outer race 14. By swaging the claw portions 13b inserted into the cutout recessed portions 14e, the lever-side side plate 13 and the lever-side outer race 14 are connected to each other. The lever-side outer race 14 and the lever-side side plate 13 fixed by swaging to the lever-side outer race 14 constitute the input-side member of the lever-side clutch portion 11.

Figure 8B:
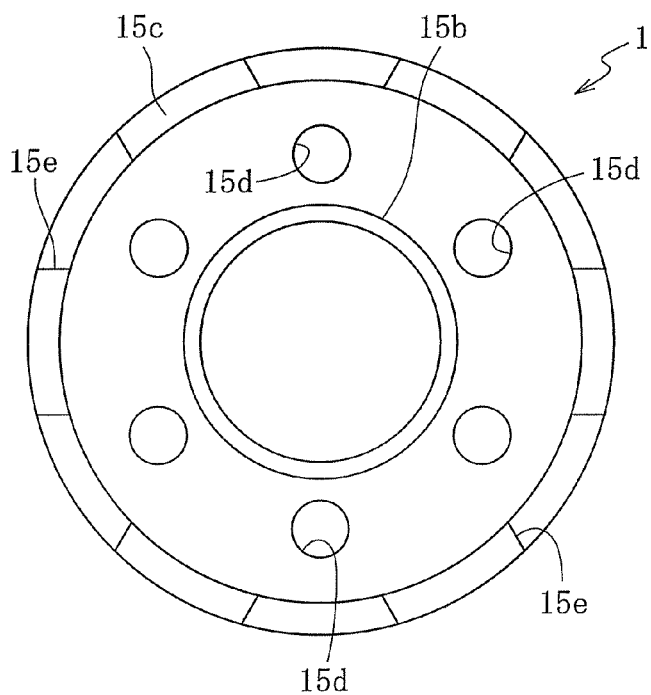
Figure 8A:
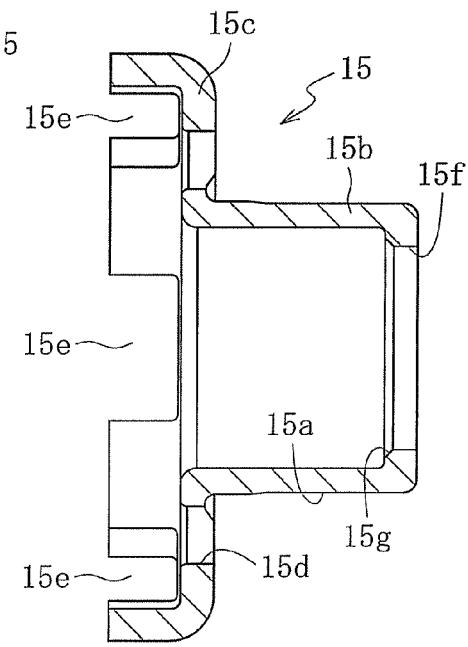
FIG. 8a is a sectional view of an inner race.

FIGS. 8a and 8b illustrate the inner race 15. The inner race 15 is provided with the outer peripheral surface 15a formed on an outer periphery of a bottomed cylindrical portion 15b into which the output shaft 22 is inserted, the wedge gaps 20 (refer to FIG. 4) being formed between the outer peripheral surface 15a and the cam surfaces 14a of the lever-side outer race 14. Further, a larger diameter portion 15c is integrally formed at an end portion of the cylindrical portion 15b. In order to cause the inner race 15 to function as a retainer on the brake-side clutch portion 12 side, pockets 15e for accommodating the cylindrical rollers 27 and the plate springs 28 are equiangularly formed in the larger diameter portion 15c. Note that, in the figures, a plurality of holes into which the protrusions 22f of the output shaft 22 (refer to FIG. 1) are inserted with clearances are represented by reference symbol 15d.

Figure 30:
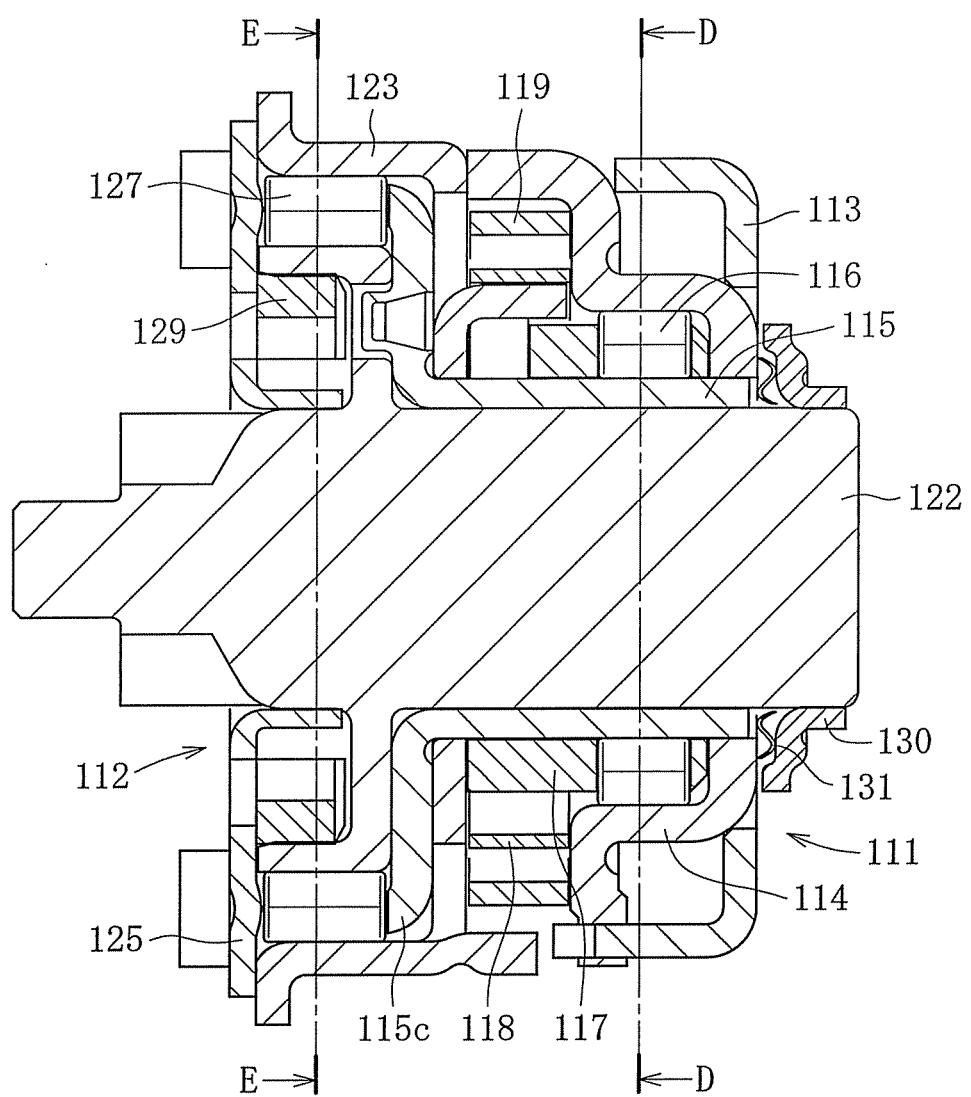
FIG. 30 is a longitudinal sectional view of an overall structure of a conventional clutch unit.
Figure 31:
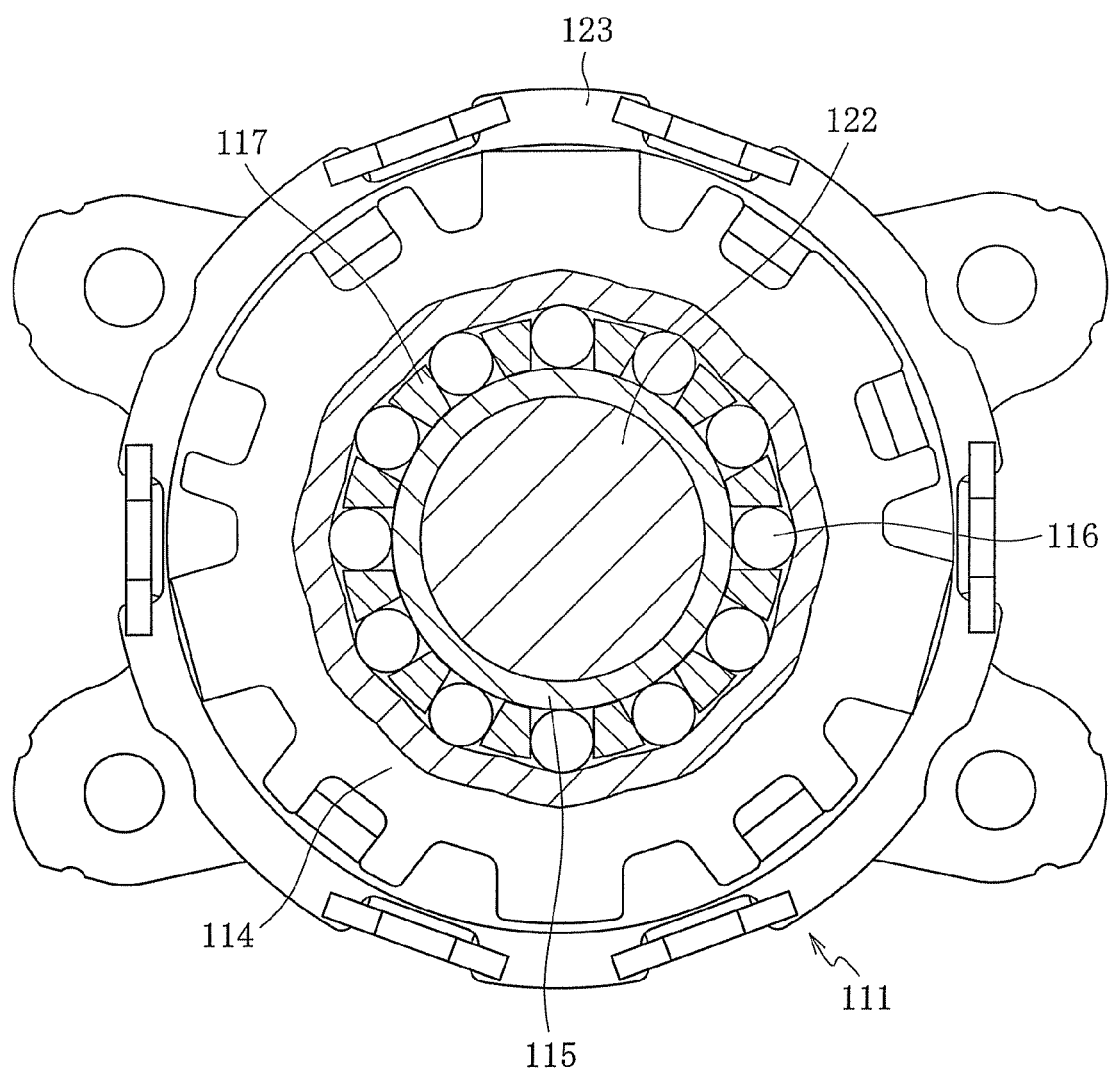
FIG. 31 is a lateral sectional view taken along the line D-D of FIG. 30.
Figure 32:
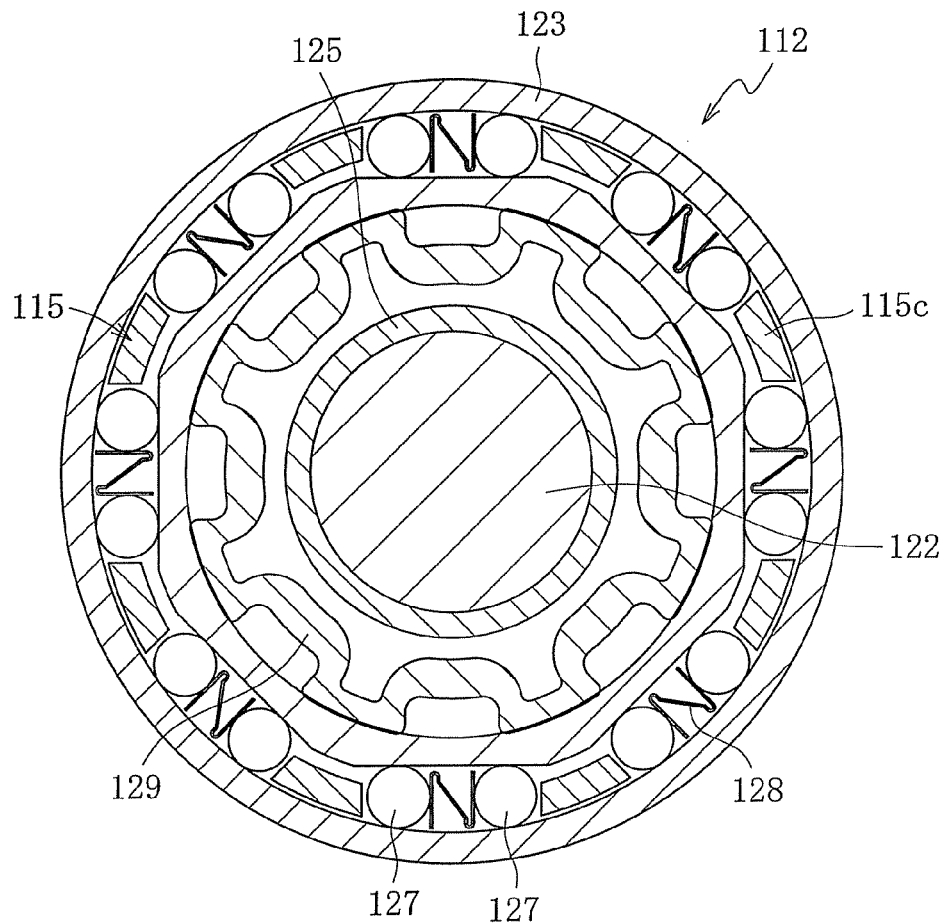
FIG. 32 is a lateral sectional view taken along the line E-E of FIG. 30.
Figure 33:
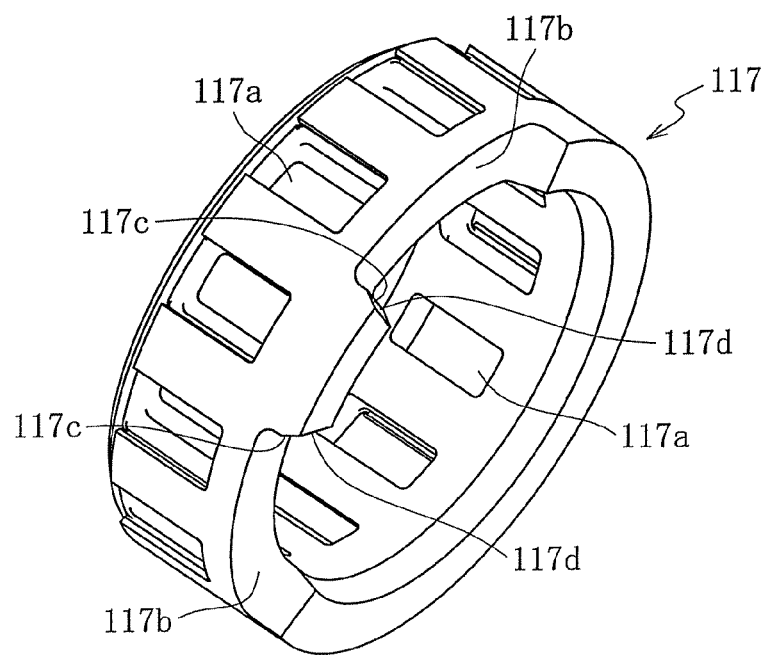
FIG. 33 is a perspective view of a retainer of the conventional clutch unit.
Figure 34C:
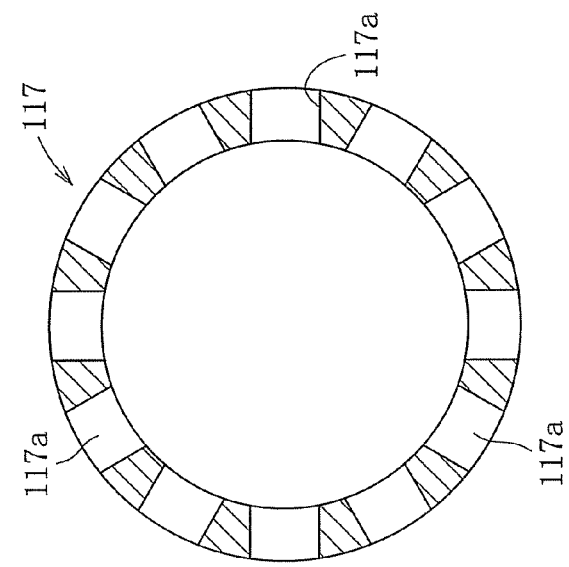
Figure 34A:
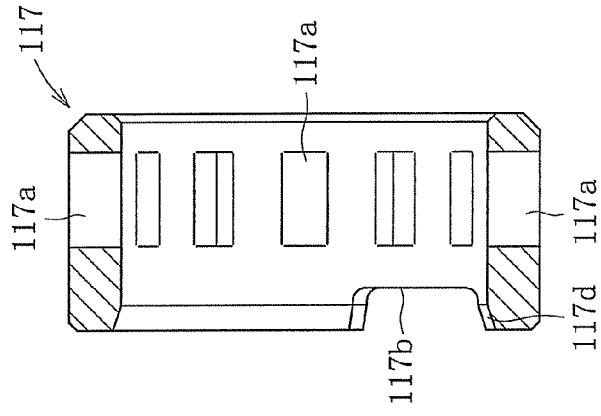
FIG. 34a is a sectional view of the retainer of FIG. 33.
Figure 34B:
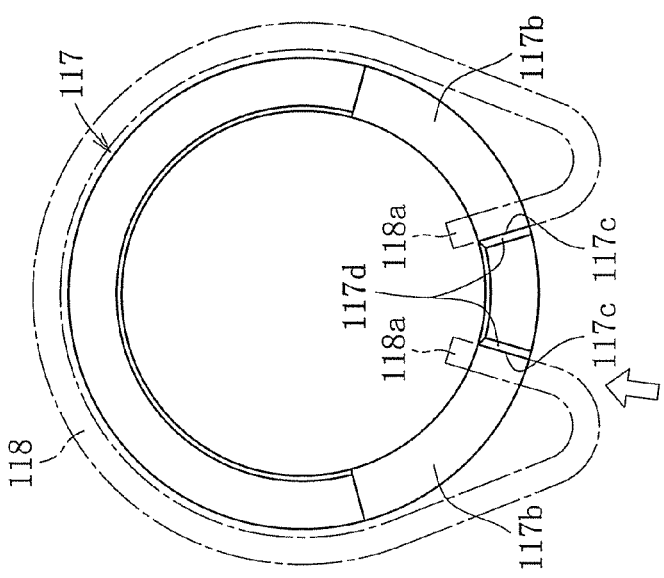
Figure 34D:
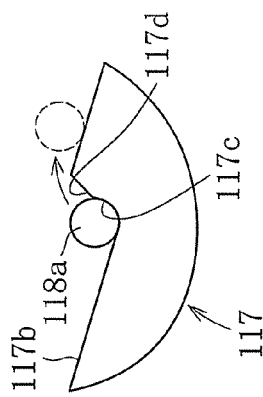
FIG. 34d is an enlarged view seen from the outline arrow of FIG. 34b.

Incidentally, the inner race 115 of the conventional clutch unit disclosed in Patent Literature 1 includes a cylindrical portion 115b through which the output shaft 122 is inserted along an inner periphery of the cylindrical portion (refer to FIG. 30). Further, through engagement/disengagement of the cylindrical rollers 116 arranged between an outer periphery of the inner race 115 and an inner periphery of the lever-side outer race 114, transmission/interruption of the torque input from the lever-side outer race 114 is controlled.

As described above, the output shaft 122 is inserted through the inner periphery of the cylindrical portion 115b of the inner race 115, and the cylindrical rollers 116 are arranged around the outer periphery thereof. Thus, in order to secure accuracy of the inner and outer diameters of the cylindrical portion 115b, when the inner race 115 is manufactured, the long cylindrical portion in an axial direction is subjected to cutting over a predetermined axial dimension. Accordingly, the cutting is required when the inner race 115 is manufactured, and hence it has been difficult to achieve cost reduction in manufacturing the inner race 115.

Further, the structure in which the output shaft 122 is inserted through the inner periphery of the cylindrical portion 115b is adopted, and hence the output shaft 122 is guided along an entire axial inner periphery of the cylindrical portion 115b. As a result, if a protrusion caused by denting exists on the outer periphery of the output shaft 122 when the inner race 115 and the output shaft 122 are assembled together, it has been sometimes difficult to insert the output shaft 122 into the inner periphery of the cylindrical portion 115b of the inner race 115.

In this context, in this embodiment, as illustrated in FIGS. 8a and 8b, a bottom portion of the cylindrical portion 15b is punched with a press, and thus a hole 15f through which the output shaft 22 (lever-side shaft portion $22c_1$ described later) is rotatably inserted is formed in the bottom portion thereof. An inner peripheral surface of the hole 15f serves as a guide surface for the rotatable output shaft 22. An inner diameter dimension of the cylindrical portion 15b is set to be larger than an outer diameter dimension of the output shaft 22, and thus a gap m is formed between the inner periphery of the cylindrical portion 15b and the outer periphery of the output shaft 22. Note that, as described above, the inner race 15 includes the hole 15f which is formed by punching the bottom portion of the cylindrical portion 15b and through which the output shaft 22 is rotatably inserted in the bottom portion thereof, and hence the cutting as in the conventional case is not required in manufacturing the inner race 15. Therefore, it is possible to achieve cost reduction in manufacturing the inner race 15, and to provide an inexpensive clutch unit.

Figure 20A:
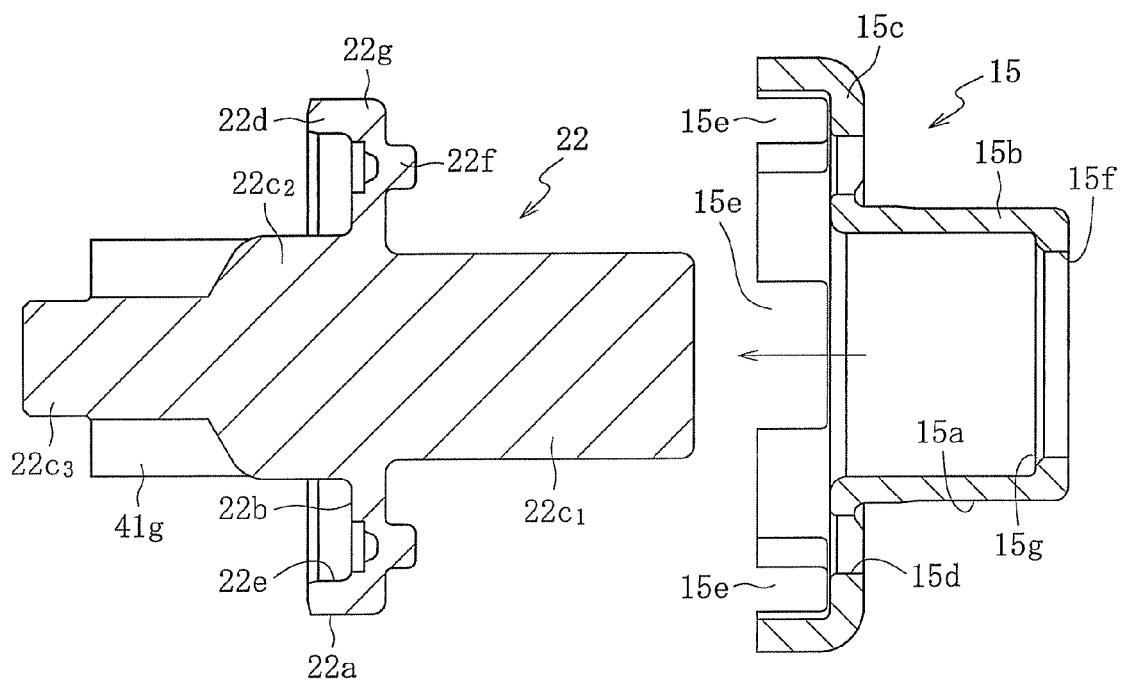
FIG. 20a is a sectional view illustrating a state before an inner race is assembled to the output shaft.
Figure 20B:
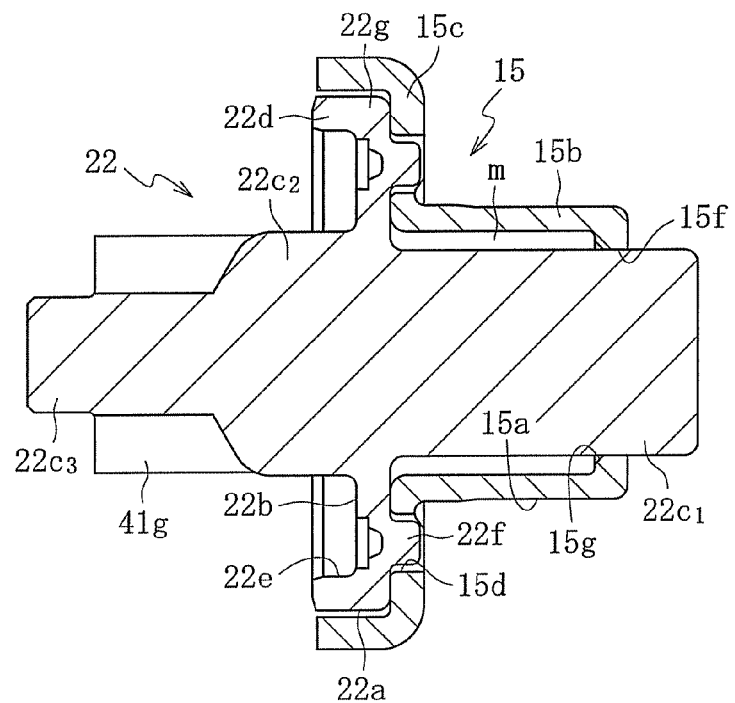
FIG. 20b is a sectional view illustrating a state after the inner race is assembled to the output shaft.

As illustrated in FIGS. 20a and 20b, the inner race 15 is assembled through inserting the output shaft 22 from the larger diameter portion 15c side into the hole 15f formed in the bottom portion of the cylindrical portion 15b. At this time, for allowing the output shaft 22 to be easily inserted into the hole 15f of the cylindrical portion 15b, a chamfered portion 15g is formed on an inner peripheral edge portion of the hole 15f. The chamfered portion 15g serves as a guide surface at the time of inserting the output shaft 22. Further, the inner diameter dimension of the cylindrical portion 15b is set to be larger than the outer diameter dimension of the output shaft 22, and thus the gap m is formed between the inner periphery of the cylindrical portion 15b and the outer periphery of the output shaft 22. Accordingly, even if a protrusion caused by denting exists on the outer peripheral surface of the output shaft 22, it is possible to insert the output shaft 22 into the cylindrical portion 15b, to thereby improve assembly performance.

FIGS. 9, and 10a to 10e illustrate the retainer 17 made of a resin. The retainer 17 is a cylindrical member in which a plurality of pockets 17a for accommodating the cylindrical rollers 16 are equiangularly formed. Two cutout recessed portions 17b are formed in an end portion on one side of the retainer 17, and lock portions 18a of the above-mentioned inner centering spring 18 are locked to adjacent two end surfaces 17c of the respective cutout recessed portions 17b (refer to FIG. 10b).

FIGS. 11a and 11b illustrate the inner centering spring 18. The inner centering spring 18 is a spring member having a circular C-shape in cross-section and including a pair of the lock portions 18a bent to a radially inner side, and is situated on the radially inner side of the outer centering spring 19 (refer to FIG. 1). The inner centering spring 18 is arranged between the retainer 17 and the cover 24 serving as a stationary-side member of the brake-side clutch portion 12 (refer to FIGS. 21a and 21b). In addition, both the lock portions 18a are locked to the two end surfaces 17c (refer to FIGS. 9 and 10b) of the retainer 17 and locked to a claw portion 24b (refer to FIGS. 17a and 17b) provided to the cover 24.

At the time of application of torque input from the lever-side outer race 14 in the inner centering spring 18, one of the lock portions 18a is engaged with one of the end surfaces 17c of the retainer 17, and the other of the lock portions 18a is engaged with the claw portion 24b of the cover 24. Thus, the inner centering spring 18 is extended in accordance with rotation of the lever-side outer race 14 so as to accumulate an elastic force. At the time of releasing the torque input from the lever-side outer race 14, the retainer 17 is restored to a neutral state with the elastic restoring force.

Figure 9:
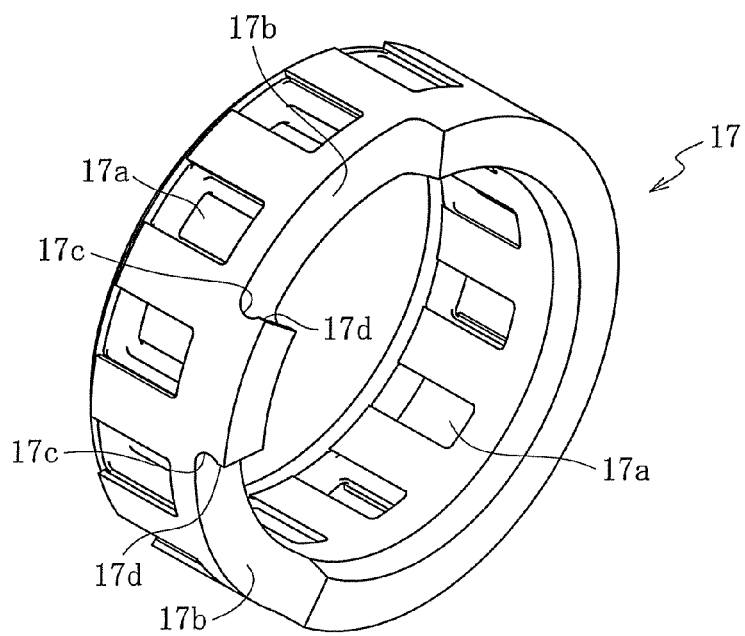
FIG. 9 is a perspective view of a retainer.

As illustrated in FIGS. 9, 10b, and 10d, on the end surfaces 17c of the retainer 17 to which the lock portions 18a of the inner centering spring 18 are respectively locked, hook portions 17d for holding the lock portions 18a of the inner centering spring 18 are provided in a protruding manner in a circumferential direction. As described above, the inner centering spring 18 is assembled between the retainer 17 and the cover 24. However, because of its assembly tolerance, the retainer 17 may be moved in the axial direction to be away from the cover 24. In this case, the inner centering spring 18 tends to enter the gap between the retainer 17 and the cover 24. However, the hook portions 17d are provided in a protruding manner, and hence, even when the lock portions 18a of the inner centering spring 18 seem to be detached from the end surfaces 17c of the retainer 17 in the axial direction, it is possible to inhibit detachment of the lock portions 18a by the hook portions 17d. As a result, it is easy to maintain the state in which the lock portions 18a of the inner centering spring 18 are locked to the end surfaces 17c of the retainer 17, and hence it is possible to cause the inner centering spring 18 to reliably exert its function.

The inner centering spring 18 has the circular shape in cross-section, and hence the end surfaces 17c of the retainer 17 to be held in contact with the lock portions 18a of the inner centering spring 18 are each formed into an arc-shape in cross-section. In this way, the end surfaces 17c of the retainer 17 are each formed into the arc-shape in cross-section conforming to a contour shape of each of the lock portions 18a of the inner centering spring 18, and thus it is possible to stabilize an abutting state in which the lock portions 18a of the inner centering spring 18 are held in contact with the end surfaces 17c of the retainer 17.

Further, a protruding dimension t of each of the hook portions 17d provided in a protruding manner on the end surfaces 17c of the retainer 17 is set to $\frac{1}{6}$ to $\frac{1}{3}$ of a wire diameter of the inner centering spring 18. With this dimensional definition, it is possible to reliably inhibit the lock portions 18a of the inner centering spring 18 from being detached from the end surfaces 17c of the retainer 17 in the axial direction. In addition, it is easy to insert the lock portions 18a of the inner centering spring 18 in the end surfaces 17c of the retainer 17 across the hook portions 17d from the axial direction when the inner centering spring 18 is assembled to the retainer 17.

Note that, when the protruding dimension t of each of the hook portions 17d is smaller than $\frac{1}{6}$ of the wire diameter of the inner centering spring 18, the lock portions 18a of the inner centering spring 18 tend to be detached from the end surfaces 17c of the retainer 17 in the axial direction. On the other hand, when the protruding dimension t is larger than $\frac{1}{3}$ thereof, it is difficult to insert the lock portions 18a of the inner centering spring 18 in the end surfaces 17c of the retainer 17 across the hook portions 17d from the axial direction when the inner centering spring 18 is assembled to the retainer 17.

Note that, distal end surfaces 17e of the hook portions 17d provided in a protruding manner on the end surfaces 17c of the retainer 17 are formed in parallel to the axial direction of the retainer 17. However, it is possible that the distal end surfaces 17e are formed into, for example, tapered inclined surfaces extending forward from the end surfaces 17c at about an angle of 45°. Further, as illustrated in FIG. 10e, when chamfered portions 17f are formed on protruding ends of the distal end surfaces 17e of the hook portions 17d, the lock portions 18a can be easily inserted across the hook portions 17d when the inner centering spring 18 is assembled to the retainer 17, and hence it is further easy to insert the lock portions 18a of the inner centering spring 18 in the end surfaces 17c of the retainer 17 from the axial direction.

Figure 12A:
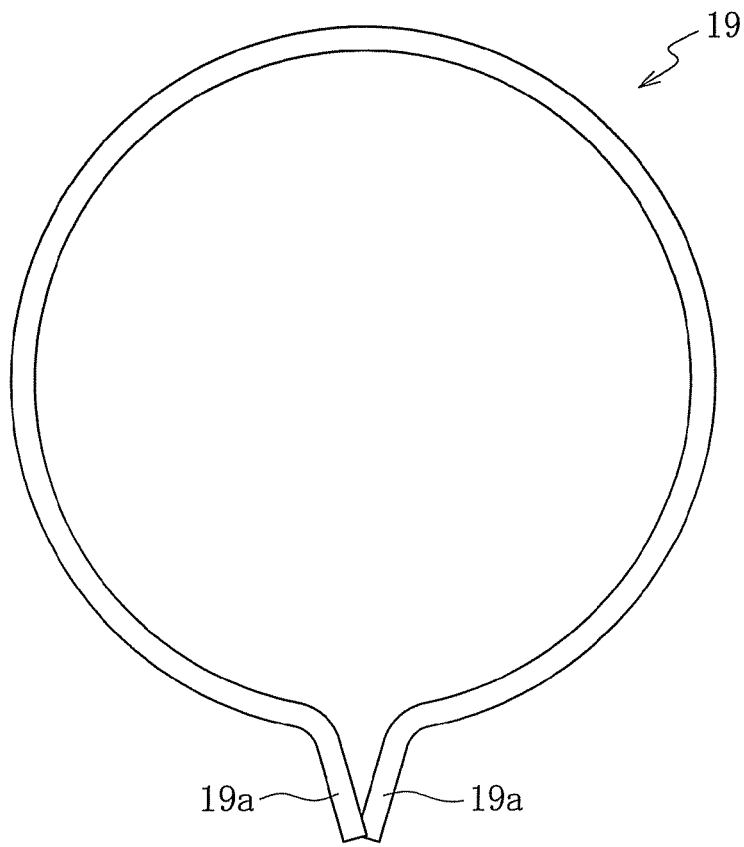
FIG. 12a is a side view of an outer centering spring.
Figure 12B:
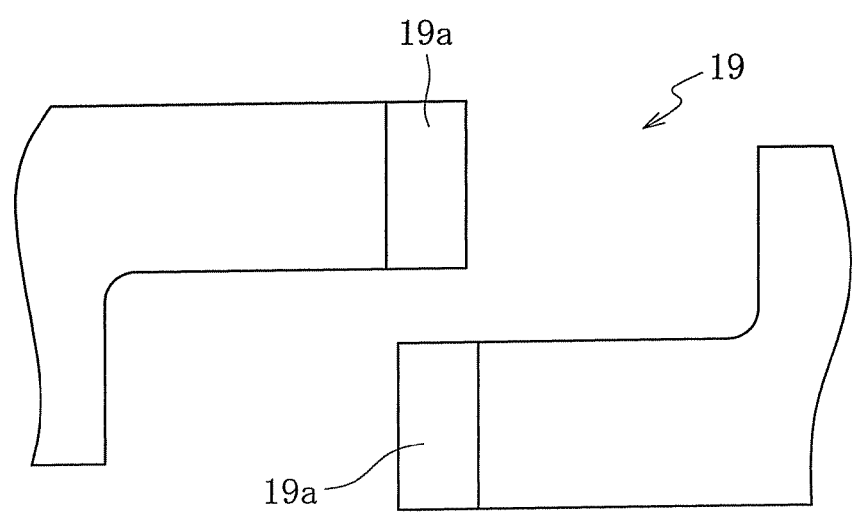
Figure 13A:
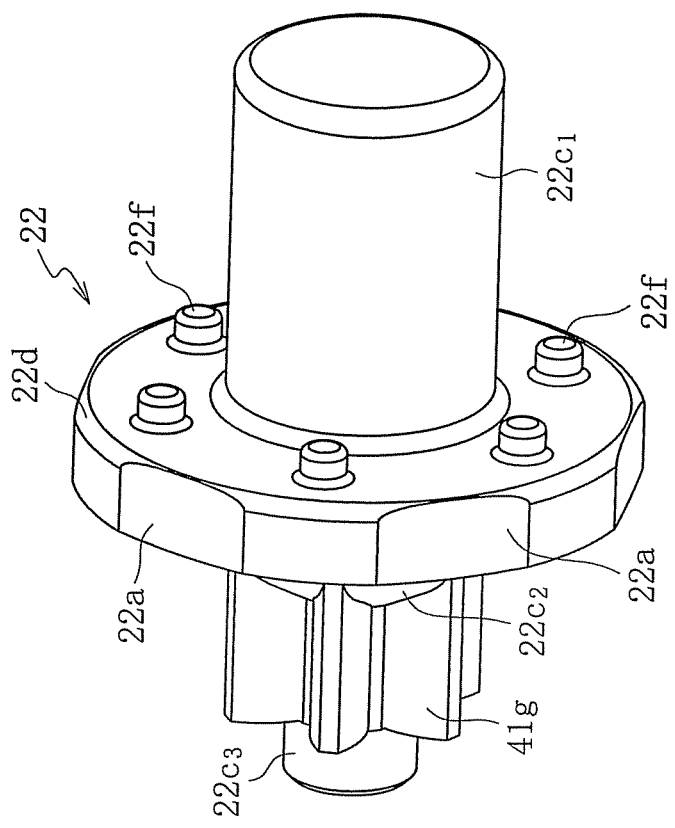
FIG. 13a is a perspective view of an output shaft seen from one side.
Figure 13B:
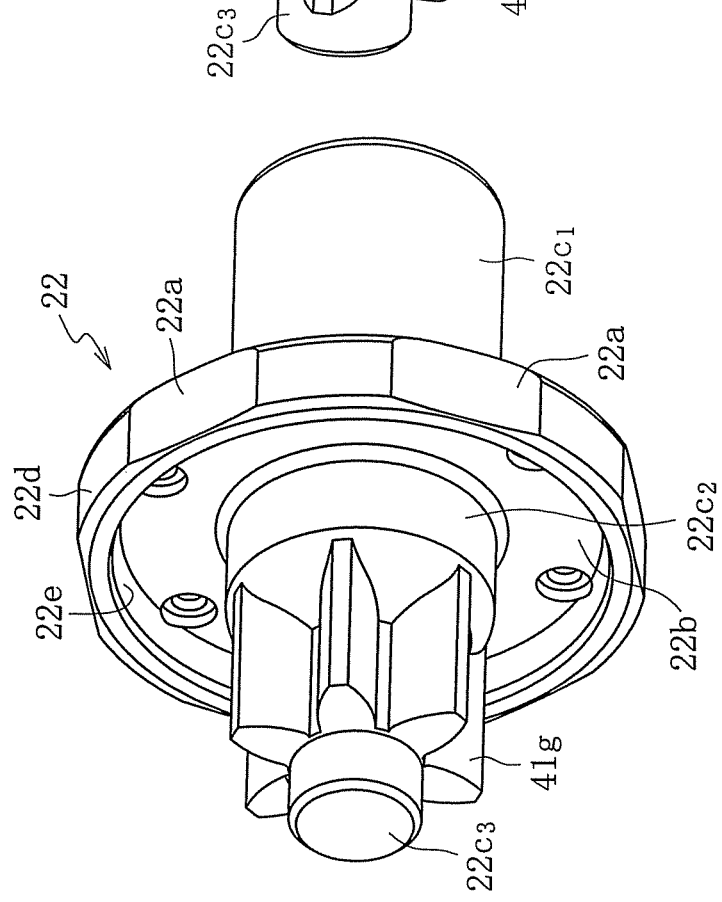
FIG. 13b is a perspective view of the output shaft seen from another side.

FIGS. 12a and 12b illustrate the outer centering spring 19. The outer centering spring 19 is a band plate-like spring member having a C-shape and the pair of lock portions 19a formed by bending both the ends thereof to a radially outer side, and is situated on a radially outer side of the inner centering spring 18 (refer to FIG. 1). Further, while being regulated in radial position with a raised portion 24g (refer to FIG. 1) provided on an input-side end surface of the cover 24 as described later, the outer centering spring 19 is arranged in a space formed between the cover 24 and the lever-side outer race 14.

Figure 23:
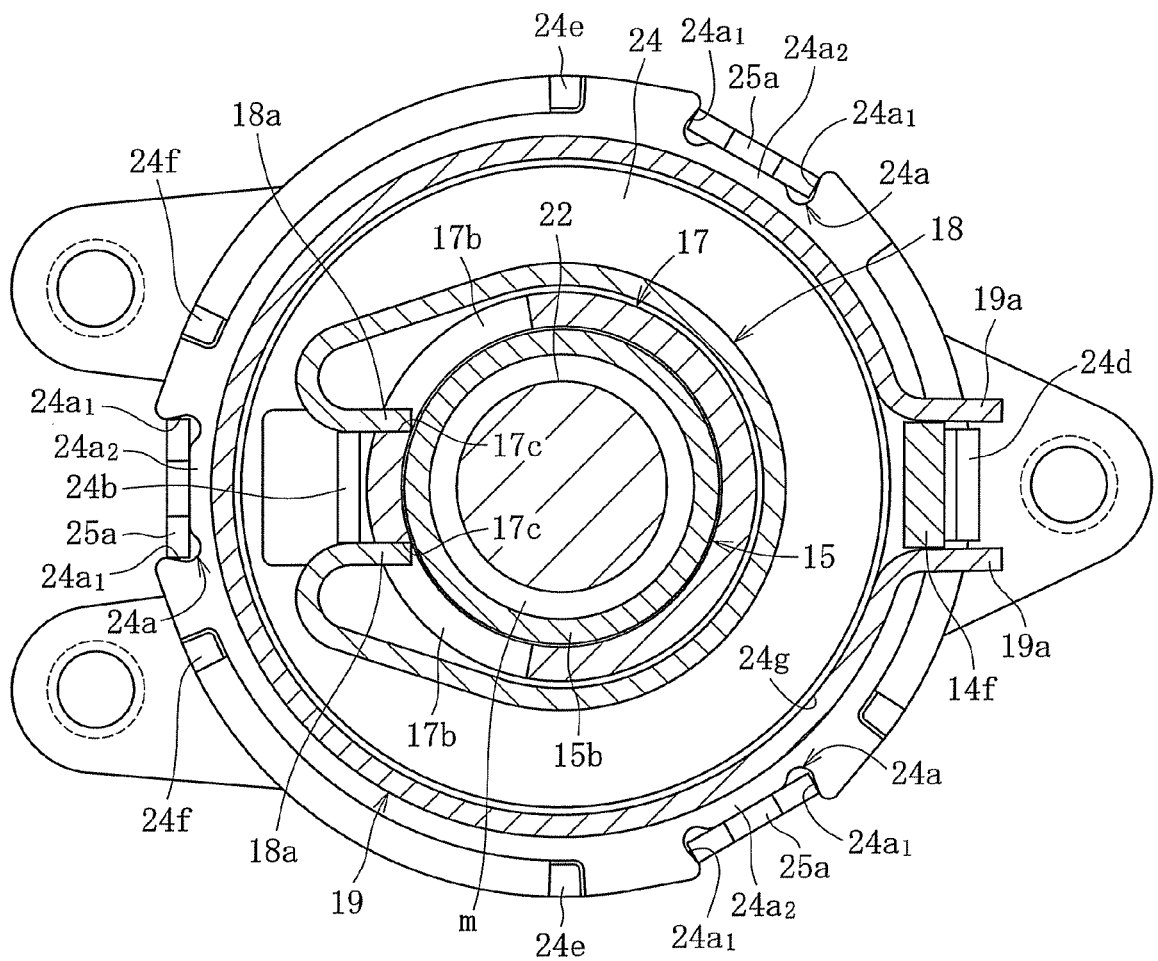
FIG. 23 is a sectional view taken along the line C-C of FIG. 1.

The outer centering spring 19 is arranged between the lever-side outer race 14 of the lever-side clutch portion 11 and the cover 24 of the brake-side clutch portion 12. As illustrated in FIG. 23, the lock portions 19a are locked to the claw portion 14f provided to the lever-side outer race 14, and the lock portions 19a are locked to a claw portion 24d provided to the cover 24 (refer to FIGS. 7a to 7c and FIGS. 17a and 17b). The lock portions 19a are arranged while being displaced (by 180°) in a circumferential direction with respect to the lock portions 18a of the inner centering spring 18.

In the outer centering spring 19, when the torque input from the lever-side outer race 14 is applied so as to rotate the lever-side outer race 14, one of the lock portions 19a is engaged with the claw portion 14f of the lever-side outer race 14, and the other of the lock portions 19a is engaged with the claw portion 24d of the cover 24, respectively. Thus, the outer centering spring 19 is extended in accordance with the rotation of the lever-side outer race 14 so as to accumulate an elastic force. When the torque input from the lever-side outer race 14 is released, the lever-side outer race 14 is restored to a neutral state with the elastic restoring force.

Note that, when the outer centering spring 19 is extended in the circumferential direction, a radially outward force is applied to the lock portions 19a, and the outer centering spring 19 are subjected to displacement in radial direction. However, the outer centering spring 19 is regulated in radial position with the raised portion 24g of the cover 24 (refer to FIGS. 17a, 17b, and 23). Thus, it is possible to prevent displacement thereof in the radial direction, and hence to reliably and stably actuate the outer centering spring 19.

FIG. 13 and FIGS. 14a to 14c illustrate the output shaft 22. The output shaft 22 is a forged member in which the lever-side shaft portion $22c_1$, a brake-side shaft portion $22c_2$, and a larger diameter portion 22d are formed integrally. The lever-side shaft portion $22c_1$ is situated on the lever-side clutch portion 11 side, and the brake-side shaft portion $22c_2$ is situated on the brake-side clutch portion 12 side. The larger diameter portion 22d is arranged between the lever-side shaft portion $22c_1$ and the brake-side shaft portion $22c_2$, and extends to the radially outer side to be increased in diameter. A pinion gear 41g to be coupled with a seat lifter section 41 is integrally formed on a distal end of the brake-side shaft portion $22c_2$.

A plurality of (six, for example) flat cam surfaces 22a are equiangularly formed on an outer peripheral surface of the larger diameter portion 22d, and the two cylindrical rollers 27 and the plate spring 28 are arranged in each wedge gap 26 (refer to FIG. 5) provided between the cam surfaces 22a and an inner peripheral surface 23b of the brake-side outer race 23. In one end surface of the larger diameter portion 22d, there is formed an annular recessed portion 22b in which a friction ring 29 is accommodated and arranged. Further, in the figures, protrusions formed on the other end surface of the larger diameter portion 22d are denoted by reference symbol 22f, the protrusions being inserted into the holes 15d of the inner race 15 with clearances (refer to FIGS. 1, 8a, and 8b).

Figure 22A:
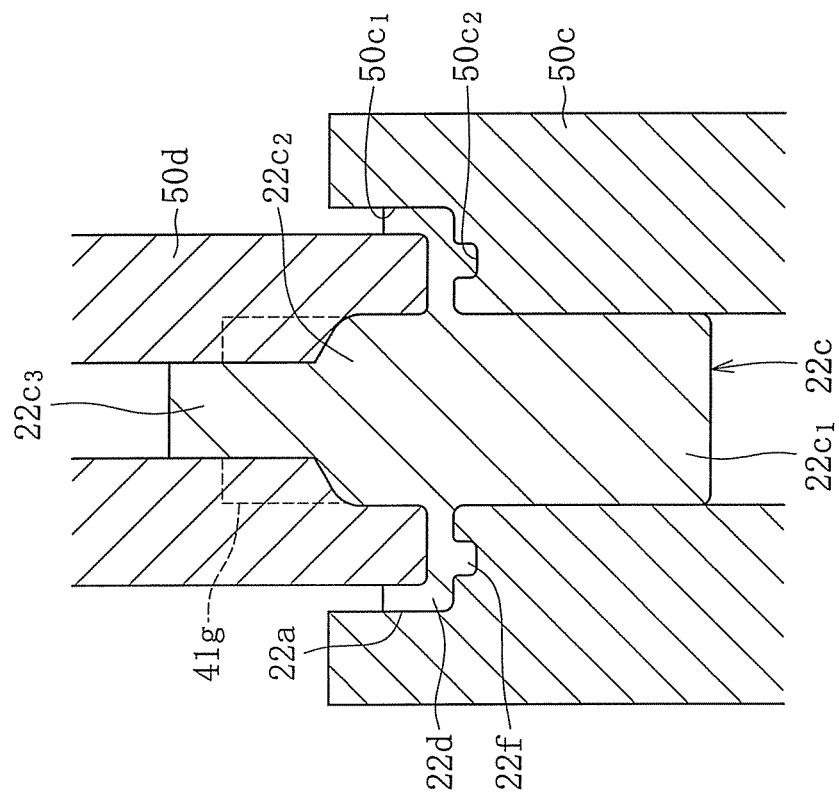
FIG. 22a is a sectional view of dies for molding a larger diameter portion of the output shaft.
Figure 22B:
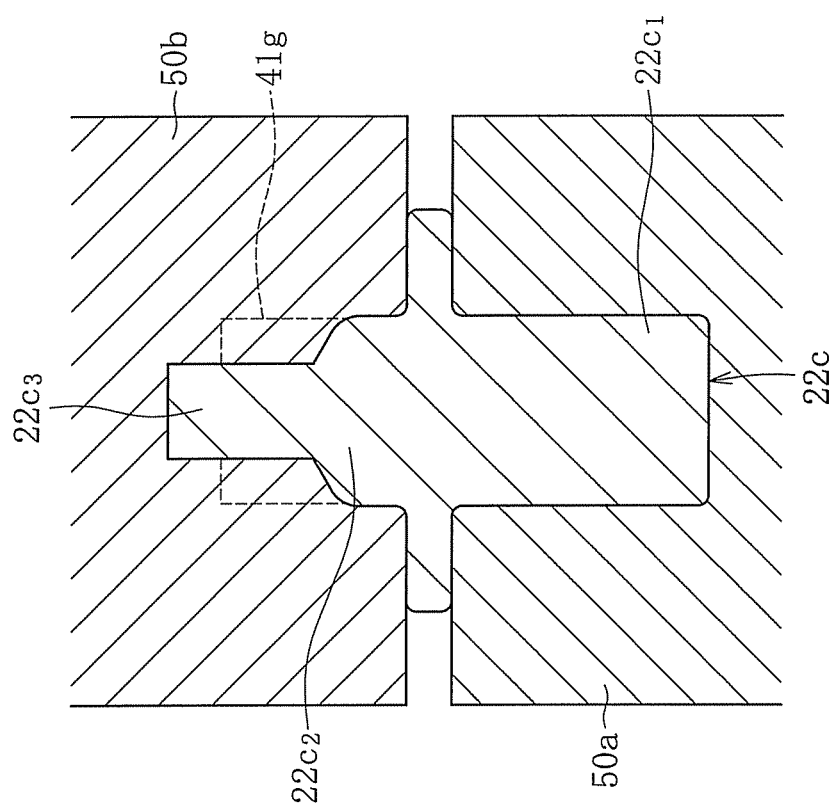
FIG. 22b is a sectional view of dies for molding cam surfaces and protrusions of the output shaft.

At the time of manufacturing by forging the output shaft 22 including the lever-side shaft portion $22c_1$, the larger diameter portion 22d, and the brake-side shaft portion $22c_2$, the lever-side shaft portion $22c_1$ is first molded with a stationary-side die 50a as illustrated in FIG. 22a, and the brake-side shaft portion $22c_2$ is molded with a movable-side die 50b. At this time, a portion to be molded into the larger diameter portion 22d is formed into a flange shape, and then, as illustrated in FIG. 22b, the larger diameter portion 22d is molded by inserting a movable-side die 50d supporting the brake-side shaft portion $22c_2$ into a stationary-side die 50c supporting the lever-side shaft portion $22c_1$. In this case, there is a risk in that the lever-side shaft portion $22c_1$ and the brake-side shaft portion $22c_2$ are non-coaxial with each other, and hence, after being forged, the brake-side shaft portion $22c_2$ is subjected to lathe turning as post-machining.

The brake-side shaft portion $22c_2$ is subjected to the lathe turning performed as post-machining after the forging, and thus coaxiality between the lever-side shaft portion $22c_1$ and the brake-side shaft portion $22c_2$ is secured. If the coaxiality between the lever-side shaft portion $22c_1$ and the brake-side shaft portion $22c_2$ is secured in this way, there is improved positioning accuracy with respect to a hole 25b (refer to FIGS. 18a and 18b) of the brake-side side plate 25 through which the brake-side shaft portion $22c_2$ is inserted. In other words, through securing the coaxiality between the lever-side shaft portion $22c_1$ and the brake-side shaft portion $22c_2$, it is possible to avoid the brake-side shaft portion $22c_2$ from being eccentrically rotated with respect to rotation of the lever-side shaft portion $22c_1$. As a result, it is possible to reduce resistance caused by contact between the brake-side side plate 25 and the brake-side shaft portion $22c_2$ inserted through the hole 25b of the brake-side side plate 25, and to suppress an increase in lever operation torque at the lever-side clutch portion 11.

Further, as described above, the output shaft 22 has the plurality of (six, for example) flat cam surfaces 22a formed on the outer peripheral surface and the plurality of (six, for example) protrusions 22f formed on the end surface on the lever-side shaft portion $22c_1$ side. At the time of manufacturing by forging the output shaft 22, as illustrated in FIG. 22b, the plurality of cam surfaces 22a and the plurality of protrusions 22f are simultaneously molded with the stationary-side die 50c for molding the lever-side shaft portion $22c_1$. In other words, the stationary-side die 50c includes a peripheral wall portion $50c_1$ for molding the cam surfaces 22a of the larger diameter portion 22d, and recessed portions $50c_2$ for molding the protrusions 22f.

The plurality of cam surfaces 22a and the plurality of protrusions 22f are simultaneously molded by the peripheral wall portion $50c_1$ and the recessed portions $50c_2$ of the one die 50c as described above, and hence misalignment is unlikely to occur in a relative positional relation between the cam surfaces 22a and the protrusions 22f. In other words, the relative positional relation between the cam surfaces 22a and the protrusions 22f is set so that, during torque transmission from the lever-side clutch portion 11 to the brake-side clutch portion 12, after the cylindrical rollers 27 engaged on the cam surfaces 22a are detached from the wedge gaps 26 and thus a locked state of the output shaft 22 is released, the clearances between the holes 15d of the inner race 15 and the protrusions 22f of the output shaft 22 are eliminated and then the inner race 15 is brought into contact with the protrusions 22f of the output shaft 22 in a rotating direction. Therefore, if the misalignment is unlikely to occur in the relative positional relation between the cam surfaces 22a and the protrusions 22f, the holes 15d of the inner race 15 and the protrusions 22f of the output shaft 22 can be reliably brought into contact with each other after the locked state of the output shaft 22 is released. As a result, smooth torque transmission is possible.

Figure 15A:
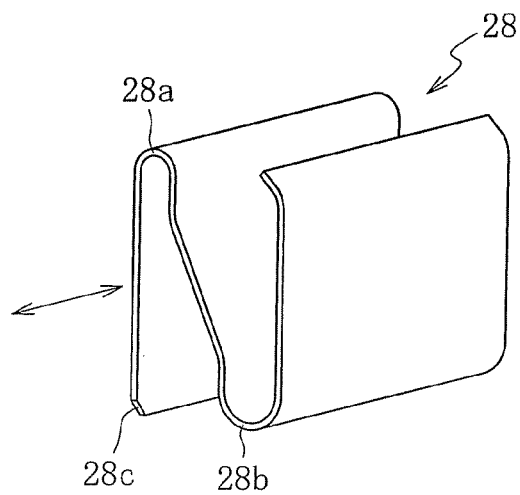
FIG. 15a is a perspective view of a plate spring of a brake-side clutch portion.
Figure 15B:
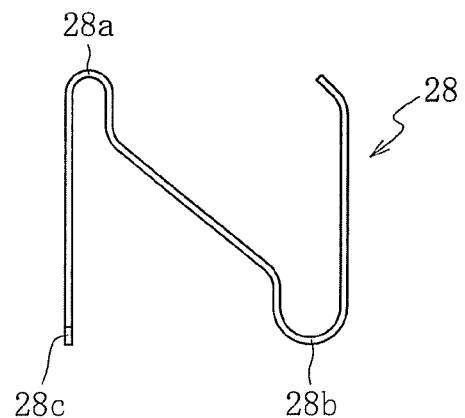
Figure 15C:
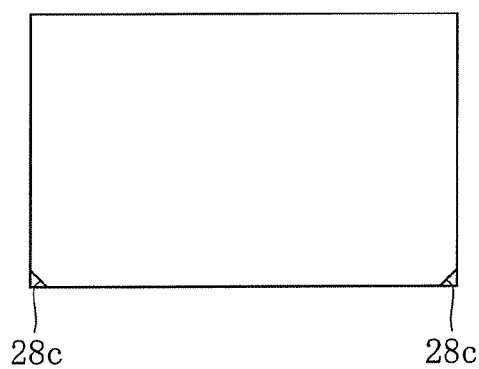

FIGS. 15a to 15d illustrate the plate spring 28 having an N-shape in cross-section. As illustrated in FIGS. 15a to 15c, the plate spring 28 includes one curved portion 28a and the other curved portion 28b formed into arc-shapes with different sizes. FIGS. 15a to 15c illustrate, for example, the case where the one curved portion 28a is formed into a small arc-shape and the other curved portion 28b is formed into a large arc-shape.

Figure 15D:
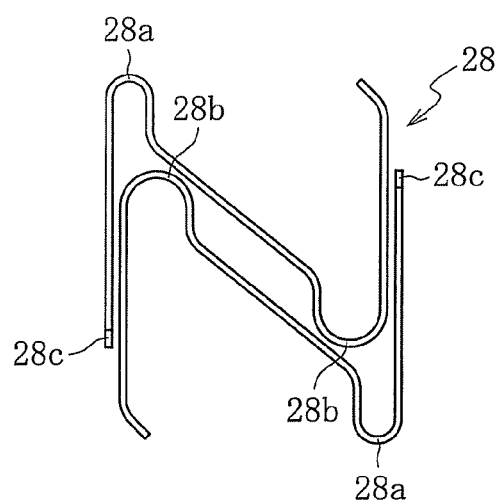
FIG. 15d is a front view illustrating a state in which the plate springs of FIG. 15b are stacked.

As described above, the one curved portion 28a and the other curved portion 28b are formed into the arc-shapes with different sizes. Thus, in the case where, when handling the plate springs 28 during transportation or the like, the plurality of plate springs 28 are stacked one above the other as illustrated in FIG. 15d, when the plurality of plate springs 28 are stacked in such a manner that the one curved portion 28a and the other curved portion 28b are situated one above the other in a staggered manner, those curved portions 28a and 28b are not fitted to each other because the one curved portion 28a and the other curved portion 28b arranged one above the other in a contact state are different from each other in arc-shape size. As a result, there is facilitated a separating work performed when the plate springs 28 are assembled to the brake-side clutch portion 12.

Further, the plate spring 28 includes chamfered portions 28c formed on both ends in a plate width direction of the end portion on the side on which the one curved portion 28a is situated. During transportation of the plate spring 28, in the case where, under a state (state illustrated in FIGS. 15a to 15c) in which the end portion on the side on which the one curved portion 28a is situated is directed downward, the plate spring 28 is placed on a conveying path and is moved in a direction indicated by an arrow of FIG. 15a, the end portion on the side on which the one curved portion 28a is situated is held in slidable contact with the conveying path. However, the chamfered portions 28c are formed on the end portion on the side on which the one curved portion 28a is situated, and hence the plate spring 28 can be conveyed smoothly on the conveying path without being caught on the conveying path.

Note that, in the above-mentioned case, the chamfered portions 28c are formed on the both ends in the plate width direction of the end portion on the side on which the one curved portion 28a is situated. However, chamfered portions may be formed also on both ends in the plate width direction of the end portion on the side on which the other curved portion 28b is situated. In this case, the plate spring 28 can be smoothly moved irrespective of whether the plate spring 28 is directed upward or downward.

FIGS. 16a to 16c and FIGS. 17a to 17c illustrate the brake-side outer race 23 and the cover 24 thereof. The brake-side outer race 23 is formed of a thick plate-like member obtained by punching of a single material, and the cover 24 is molded by pressing of another single material. FIGS. 18a and 18b illustrate a brake-side side plate 25. The brake-side outer race 23 and the cover 24 are integrally fixed to each other with the brake-side side plate 25 by swaging. Note that, a hole into which the output shaft 22 is inserted is represented by reference symbol 25b, and holes with which protrusions 29a of the friction ring 29 are fitted are represented by reference symbol 25c, the protrusions 29a being described later.

Figure 24A:
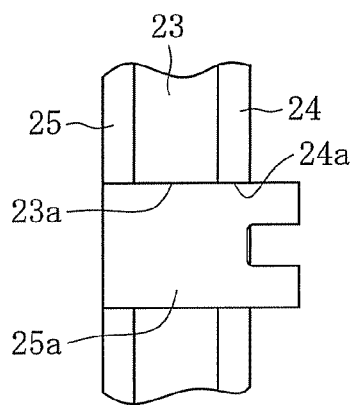
FIG. 24a is an enlarged plan view of a main part, illustrating a state before swaging in a swaging structure of the brake-side outer race, the cover, and the brake-side side plate.
Figure 24B:
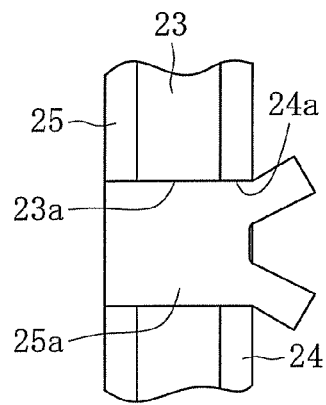
FIG. 24b is an enlarged plan view of a main part, illustrating a state after swaging in the swaging structure of the brake-side outer race, the cover, and the brake-side side plate.
Figure 25A:
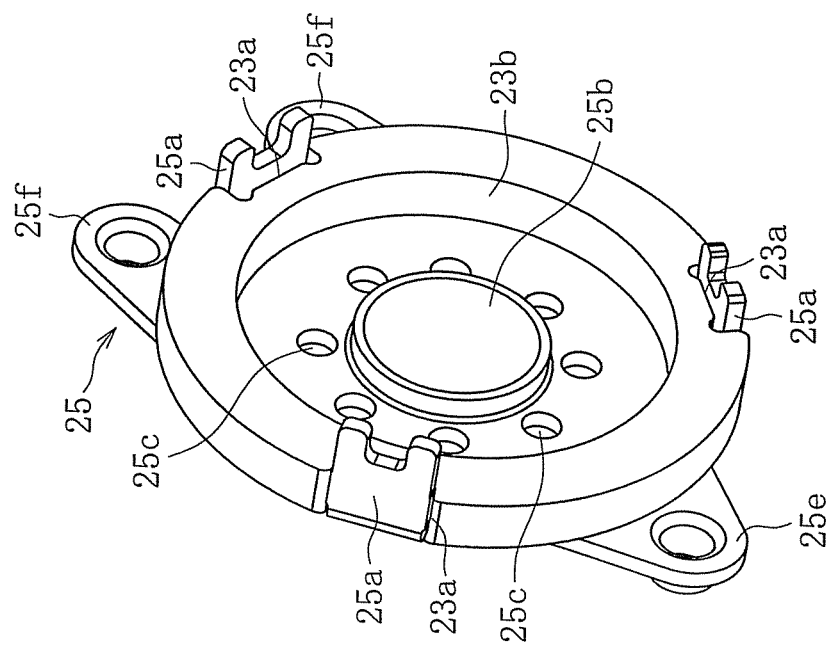
FIG. 25a is a perspective view illustrating a state before the brake-side outer race is assembled to the brake-side side plate.
Figure 25B:
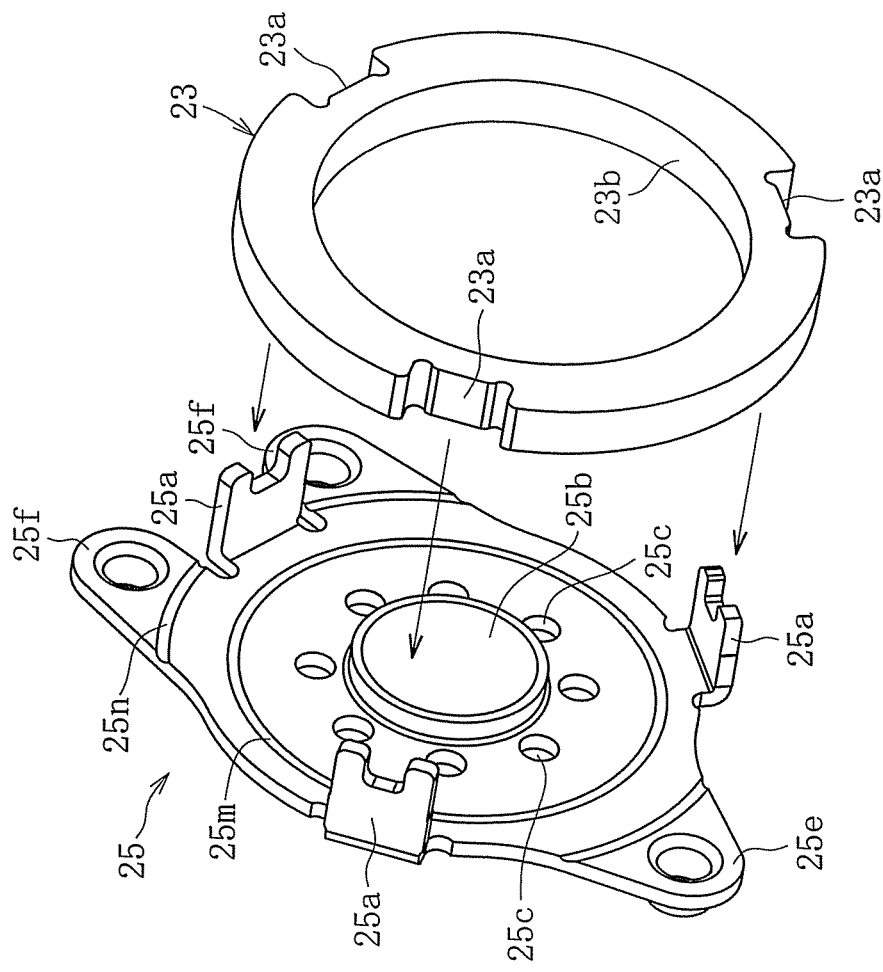
FIG. 25b A perspective view illustrating a state after the brake-side outer race is assembled to the brake-side side plate.

A plurality of (three) cutout recessed portions 23a are formed on an outer periphery of the brake-side outer race 23. Correspondingly to the cutout recessed portions 23a, a plurality of (three) cutout recessed portions 24a are similarly formed on an outer periphery of the cover 24. Claw portions 25a of the brake-side side plate 25 are inserted into the cutout recessed portions 23a and 24a (refer to FIGS. 21a, 21b, and 24a). By swaging the claw portions 25a inserted into the cutout recessed portions 23a and 24a, the brake-side outer race 23 and the cover 24 are coupled with each other and integrated with the brake-side side plate 25 (refer to FIG. 24b). As illustrated in FIGS. 24a and 24b, swaging of the claw portions 25a of the brake-side side plate 25 is performed by increasing outward the distance between the bisected distal end portions of each of the claw portions 25a.

Figure 17B:
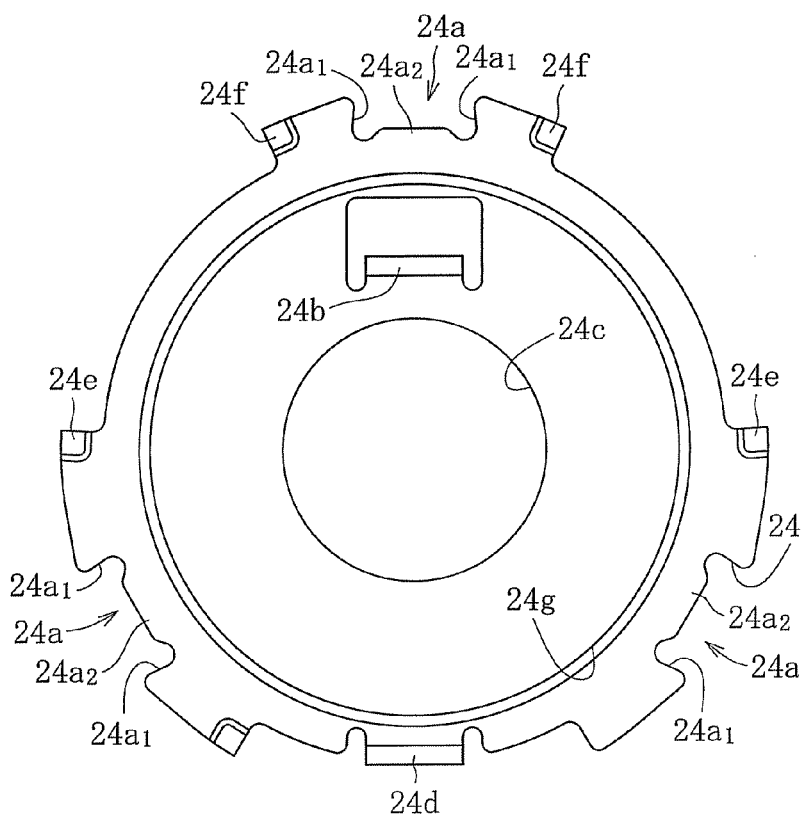
Figure 17A:
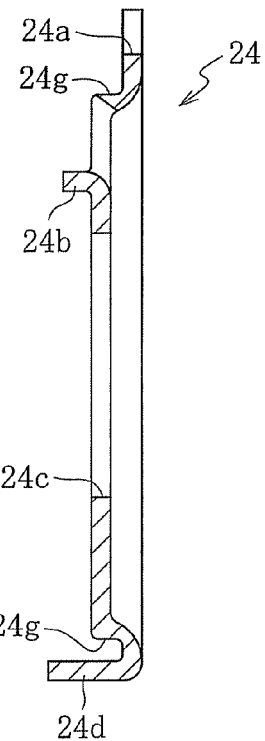
FIG. 17a is a sectional view of a cover.
Figure 17C:
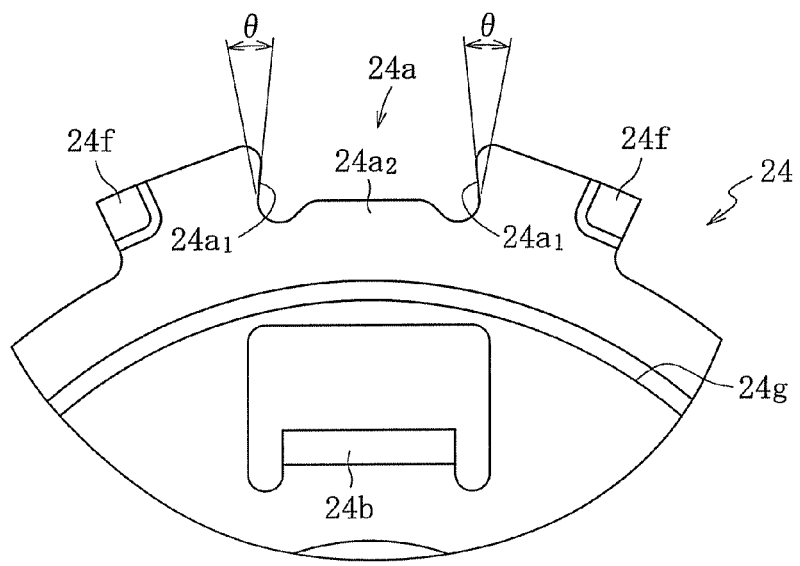
FIG. 17c is a partially enlarged view of one of cutout recessed portions of FIG. 17b.

As illustrated in FIGS. 16a to 16c, in each of the cutout recessed portions 23a of the brake-side outer race 23, both opposed side end surfaces $23a_1$ are tapered to form a predetermined angle θ with respect to the radial direction. As illustrated in FIGS. 17a to 17c, in each of the cutout recessed portions 24a of the cover 24, both opposed side end surfaces $24a_1$ are tapered to form a predetermined angle θ with respect to the radial direction. In other words, the both side end surfaces $23a_1$ of the cutout recessed portion 23a and the both side end surfaces $24a_1$ of the cutout recessed portion 24a are formed into tapered shapes inclined in a direction of coming close to the radially outer side. Width dimensions of the both side end surfaces $23a_1$ and $24a_1$ are gradually decreased to the radially outer side.

As described above, the both side end surfaces $23a_1$ of the cutout recessed portions 23a of the brake-side outer race 23 and the both side end surfaces $24a_1$ of the cutout recessed portions 24a of the cover 24 are tapered, and hence it is possible to reduce an amount by which the claw portions 25a inserted into the cutout recessed portions 23a and 24a are moved to the radially outer side. As a result, the claw portions 25a of the brake-side side plate 25 are prevented from being detached from the cutout recessed portions 23a and 24a.

Further, a trapezoid receiving portion $23a_2$ is provided on a bottom surface of each of the cutout recessed portions 23a of the brake-side outer race 23, and a trapezoid receiving portion $24a_2$ is provided on a bottom surface of each of the cutout recessed portions 24a of the cover 24. The trapezoid receiving portions $23a_2$ and $24a_2$ as described above are provided, and hence it is possible to regulate radially-inward movement of the claw portions 25a inserted into the cutout recessed portions 23a and 24a. Note that, it is preferred that a chamfered portion $23a_3$ be formed at an edge on the brake-side side plate 25 side in the bottom surface of each of the cutout recessed portions 23a of the brake-side outer race 23 (refer to FIG. 16a). The chamfered portion $23a_3$ serves as a relief for a bent base portion of each of the claw portions 25a of the brake-side side plate 25, and hence it is possible to reliably bring the claw portions 25a of the brake-side side plate 25 into contact with the receiving portions $23a_2$ and $24a_2$, and to reliably regulate the radially-inward movement.

As described above, it is necessary to assemble the brake-side outer race 23 and the brake-side side plate 25 together in a close contact state without a gap. Meanwhile, the brake-side outer race 23 is formed of a thick plate-like member obtained by punching of a single material, and hence burrs may be present at inner and outer peripheral edge portions thereof.

In this context, as illustrated in FIGS. 18a and 18b, in a surface of the brake-side side plate 25 opposed to the brake-side outer race 23, there are formed annular recessed grooves 25m and 25n for accommodating the burrs present in the brake-side outer race 23. The inner recessed groove 25m situated on the radially inner side is provided at a position corresponding to the inner peripheral edge portion of the brake-side outer race 23, and the outer recessed groove 25n situated on the radially outer side is provided at a position corresponding to the outer peripheral edge portion of the brake-side outer race 23.

In this way, the inner recessed groove 25m and the outer recessed groove 25n are formed in the surface of the brake-side side plate 25 opposed to the brake-side outer race 23. Accordingly, even when the burrs are present at the inner and outer peripheral edge portions of the brake-side outer race 23, the burrs can be accommodated in the inner recessed groove 25m and the outer recessed groove 25n, and thus sandwiching of the burrs, etc. is eliminated. Therefore, it is possible to assemble the brake-side outer race 23 and the brake-side side plate 25 together in a close contact state without a gap (refer to FIGS. 25a and 25b). As a result, it is unnecessary to perform a burr removing process for the brake-side outer race 23, which has been conventionally performed, and hence it is possible to achieve cost reduction in manufacturing the brake-side outer race 23, and to improve assembly performance between the brake-side side plate 25 and the brake-side outer race 23.

The wedge gaps 26 are formed between the inner peripheral surface 23b of the brake-side outer race 23 and the cam surfaces 22a of the output shaft 22 (refer to FIG. 5). The cover 24 is provided with the claw portion 24b protruding in the axial direction, the claw portion 24b being arranged between the two lock portions 18a of the inner centering spring 18 of the lever-side clutch portion (refer to FIGS. 11b and 23).

The claw portion 24b of the cover 24 is formed by raising the surface of the cover 24 on the radially outer side of the claw-portion-formation portion. The claw portion 24d protruding in the axial direction is formed on the outer periphery of the cover 24. The claw portion 24d is arranged between the two lock portions 19a of the outer centering spring 19 of the lever-side clutch portion 11 (refer to FIGS. 12a and 23). On the inside of the outer periphery of the cover 24, the raised portion 24g is formed coaxially with a punched hole 24c. With the raised portion 24g, the outer centering spring 19 is regulated in radial position.

Figure 21A:
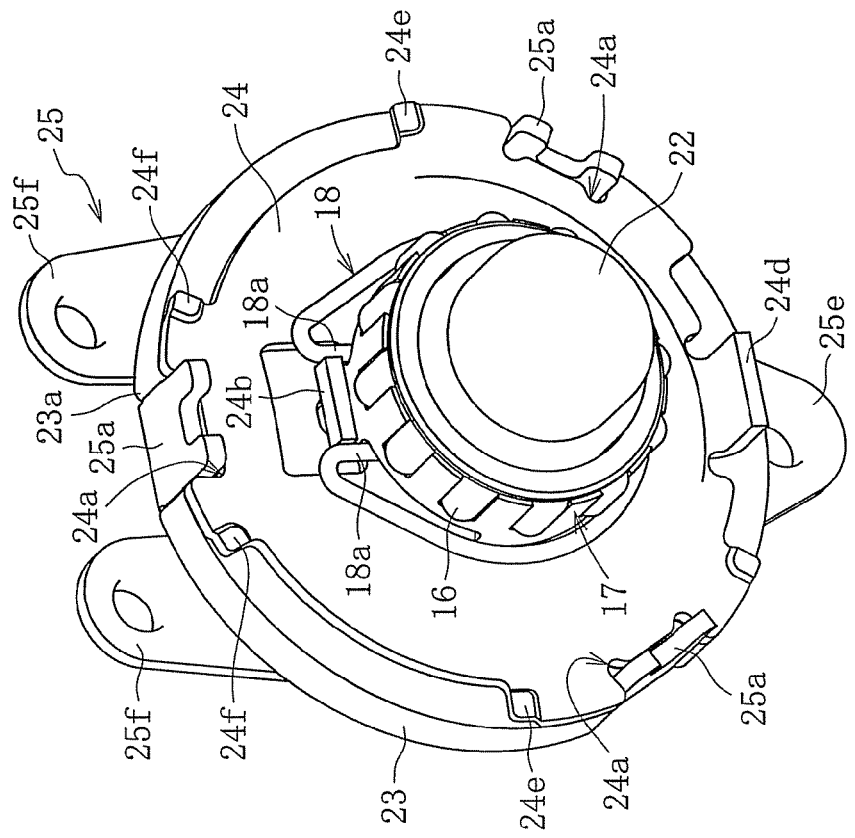
FIG. 21a is a perspective view illustrating a state before the retainer is assembled to the brake-side side plate, the brake-side outer race, the cover, and the inner centering spring.
Figure 21B:
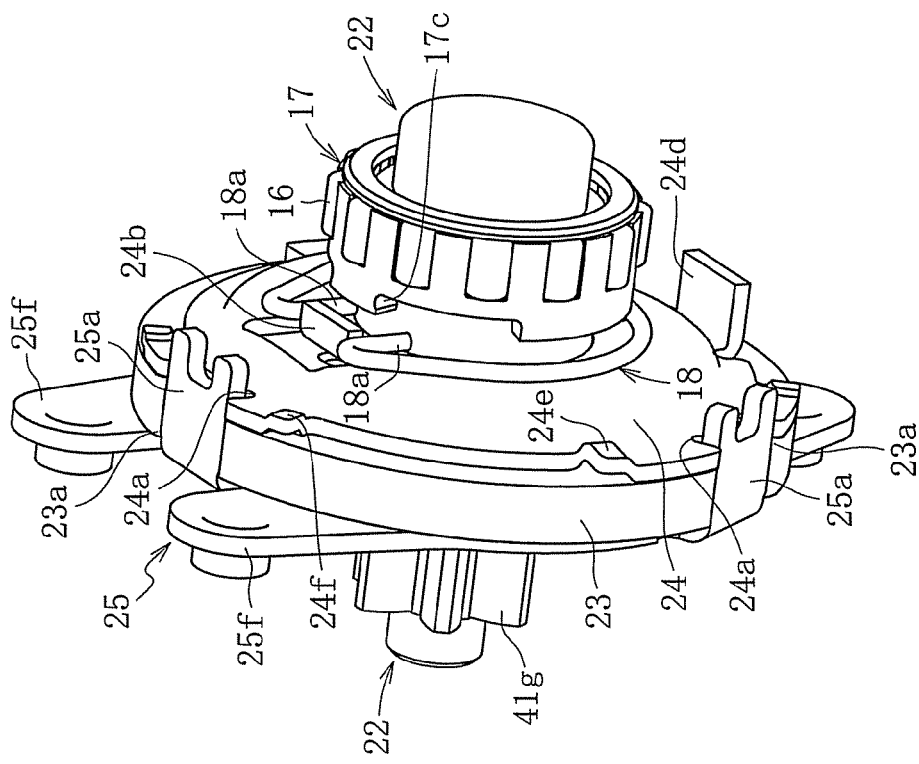
FIG. 21b is a perspective view illustrating a state after the retainer is assembled to the brake-side side plate, the brake-side outer race, the cover, and the inner centering spring.

Two pairs of the lock portions 24e and 24f are formed by stepping on the outer periphery of the cover 24 (refer to FIGS. 21a and 21b). Those lock portions 24e and 24f are provided on the outer periphery of the lever-side outer race 14. In a state in which the cover 24 is held in contact with the end surface of the brake-side outer race 23, in accordance with rotation of the lever-side outer race 14, the lock portions 24e and 24f are allowed to be brought into contact, in a rotational direction, with the claw portions 14g sliding on the end surface of the brake-side outer race 23. As a result, the lock portions 24e and 24f function as rotation stoppers for regulating an operating angle of the operation lever. In other words, when the lever-side outer race 14 is rotated with operation of the operation lever, the claw portions 14g thereof move along the outer periphery of the cover 24 between the lock portions 24e and 24f of the cover 24.

On the outer periphery of the brake-side side plate 25, one flange portion 25e and two flange portions 25f are provided as clutch attachment portions with respect to the seat lifter section (refer to FIGS. 2 to 4). In distal end portions of those three flange portions 25e and 25f, there are formed, by boring, attachment holes 25g and 25h for allowing attachment with respect to the seat lifter section, and there are protrudingly formed, in the axial direction, cylindrical portions 25i and 25j in a manner of surrounding the attachment holes 25g and 25h.

Figure 19C:
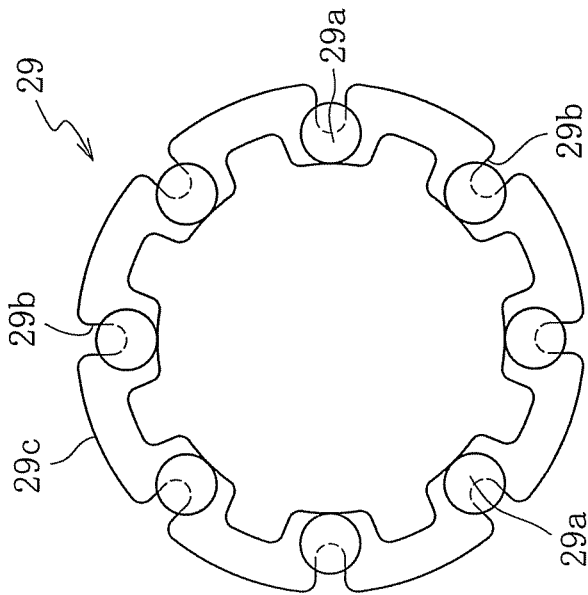
Figure 19A:
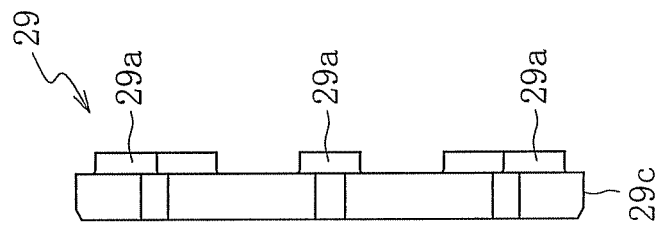
FIG. 19a is a front view of a friction ring.
Figure 19B:
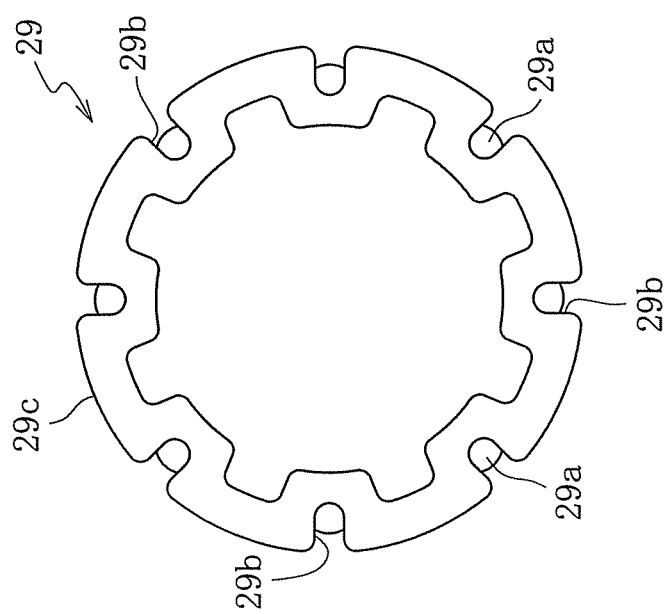

FIGS. 19a to 19c illustrate the friction ring 29 made of a resin. On an end surface of the friction ring 29, the plurality of circular protrusions 29a are equiangularly formed. By press-fitting the protrusions 29a into the holes 25c of the brake-side side plate 25, the friction ring 29 is fixed to the brake-side side plate 25 (refer to FIGS. 1 and 3).

In the case of press-fitting of the protrusions 29a, engagement state with the holes 25c can be achieved owing to elastic deformation of the protrusions 29a made of a resin material. By adopting a press-fit engagement structure of the protrusions 29a and the holes 25c, it is possible to prevent the friction ring 29 from falling off from the brake-side side plate 25 owing to handling during transportation or the like. As a result, it is possible to increase handling properties at the time of assembly.

Figure 14C:
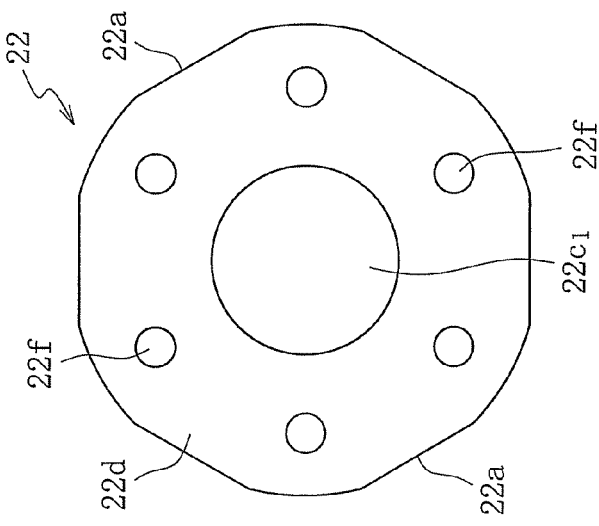
Figure 14A:
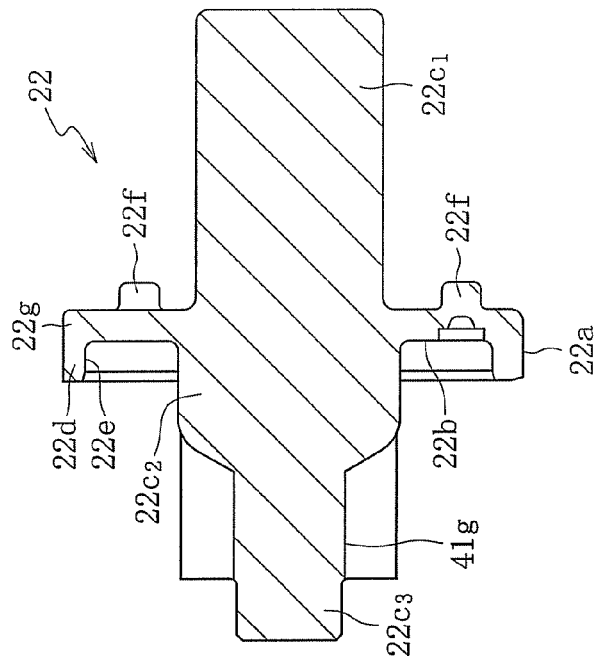
FIG. 14a is a sectional view of the output shaft.
Figure 14B:
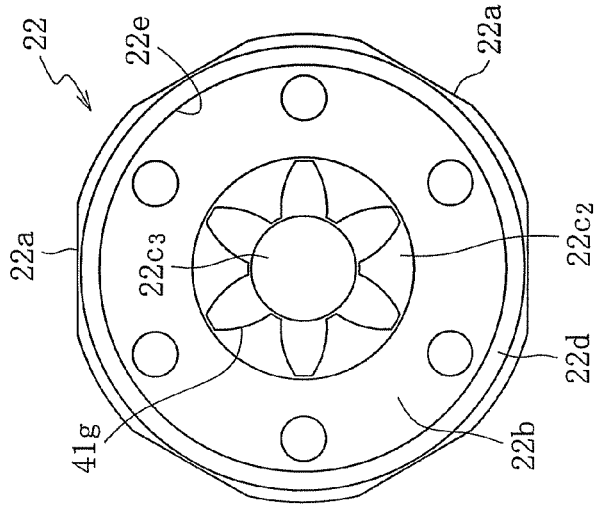

The friction ring 29 is press-fitted to an inner peripheral surface 22e of the annular recessed portion 22b formed in the larger diameter portion 22d of the output shaft 22 with fastening allowance (refer to FIGS. 14a and 14b). Owing to a frictional force generated between an outer peripheral surface 29c of the friction ring 29 and the inner peripheral surface 22e of the annular recessed portion 22b of the output shaft 22, rotational resistance is imparted to the output shaft 22. Imparting of the rotational resistance prevents stick-slip sound generated by abrupt slippage occurring between the brake-side side plate 25 as a stationary-side member and the output shaft 22. Degree of the rotational resistance may be appropriately set in consideration of degree of reverse-input torque input to the output shaft 22.

On the outer peripheral surface 29c of the friction ring 29, there are equiangularly formed a plurality of groove-like slits 29b (refer to FIG. 5). With provision of the slits 29b as in this case, an elastic force may be imparted to the friction ring 29. Thus, a rate of change in sliding torque is not increased with respect to inner diameter tolerance of the output shaft 22 and outer diameter tolerance of the friction ring 29.

In other words, it is possible to reduce a setting range of rotational resistance imparted by the frictional force generated between the outer peripheral surface 29c of the friction ring 29 and the inner peripheral surface 22e of the annular recessed portion 22b of the output shaft 22, and hence to appropriately and easily set the degree of the rotational resistance. Further, the slits 29b serve as grease pools, and hence it is possible to suppress abrasion of the outer peripheral surface 29c of the friction ring 29 owing to sliding with respect to the inner peripheral surface 22e of the annular recessed portion 22b of the output shaft 22.

Description is made on operation of the lever-side clutch portion 11 and the brake-side clutch portion 12 of the clutch unit X structured as described above.

In the lever-side clutch portion 11, when the input torque is applied to the lever-side outer race 14, the cylindrical rollers 16 are engaged into the wedge gaps 20 between the lever-side outer race 14 and the inner race 15. The inner race 15 is rotated with torque transmitted to the inner race 15 through intermediation of the cylindrical rollers 16. Simultaneously, an elastic force is accumulated in both the centering springs 18 and 19 in accordance with rotation of the lever-side outer race 14 and the retainer 17. When the input torque is interrupted, the lever-side outer race 14 and the retainer 17 are restored to a neutral state with the elastic force of both the centering springs 18 and 19. Meanwhile, the inner race 15 is maintained at the fixed rotational position. Accordingly, the inner race 15 is rotated in an inching manner with repetitive rotation of the lever-side outer race 14, in other words, pumping operation of the operation lever.

In the brake-side clutch portion 12, when reverse-input torque is input to the output shaft 22, the cylindrical rollers 27 are engaged into the wedge gaps 26 between the output shaft 22 and the brake-side outer race 23 so as to lock the output shaft 22 with respect to the brake-side outer race 23. Accordingly, the torque reverse-input from the output shaft 22 is locked by the brake-side clutch portion 12 so as to interrupt back-flow of the torque reverse-input to the lever-side clutch portion 11.

Meanwhile, description is made on a case where the torque input from the lever-side outer race 14 is input to the inner race 15 through intermediation of the lever-side clutch portion 11. When the inner race 15 is brought into contact with the cylindrical rollers 27 and presses the cylindrical rollers 27 against the elastic force of the plate springs 28, the cylindrical rollers 27 are detached from the wedge gaps 26 and a locked state of the output shaft 22 is released. As a result, the output shaft 22 is allowed to be rotated. When the inner race 15 is further rotated, clearances between the holes 15d of the inner race 15 and the protrusions 22f of the output shaft 22 are eliminated, and the inner race 15 is brought into contact with the protrusions 22f of the output shaft 22 in a rotational direction. As a result, the torque input from the inner race 15 is transmitted to the output shaft 22 through intermediation of the protrusions 22f, and the output shaft 22 is rotated.

Figure 26:
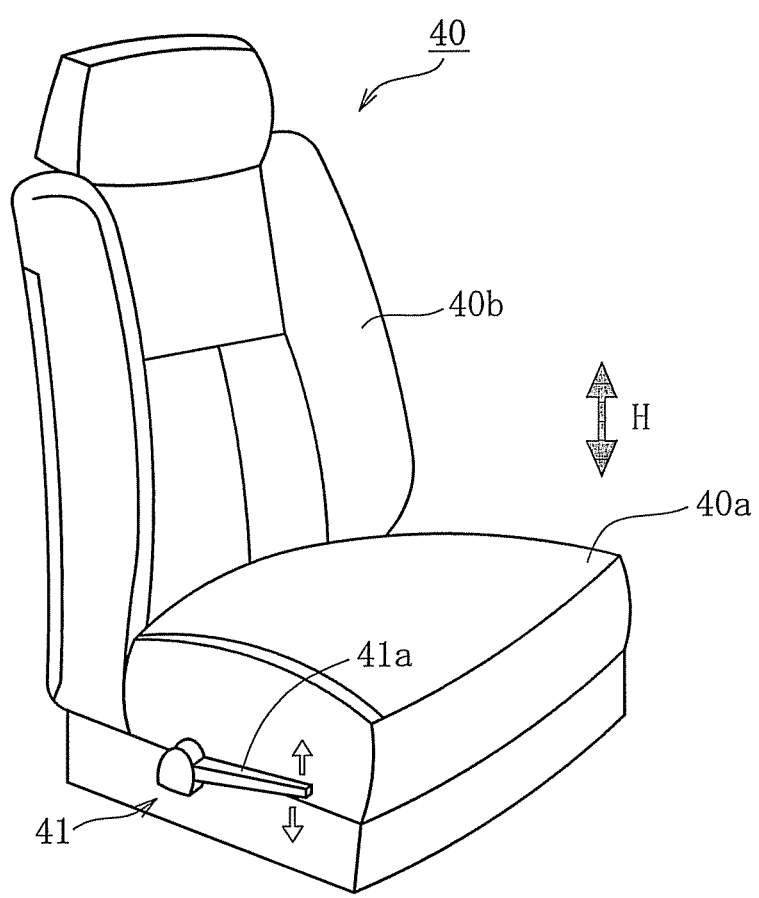
FIG. 26 is a conceptual view of a seat of an automobile.

The clutch unit X provided with a structure as described above in detail is used while being incorporated into, for example, an automobile seat-lifter section. FIG. 26 illustrates a seat 40 installed in a cabin of an automobile. The seat 40 includes a sitting seat 40a, a backrest seat 40b, and the seat lifter section 41 for adjusting a height H of the sitting seat 40a. Adjustment of the height H of the sitting seat 40a is performed with an operation lever 41a of the seat lifter section 41.

Figure 27A:
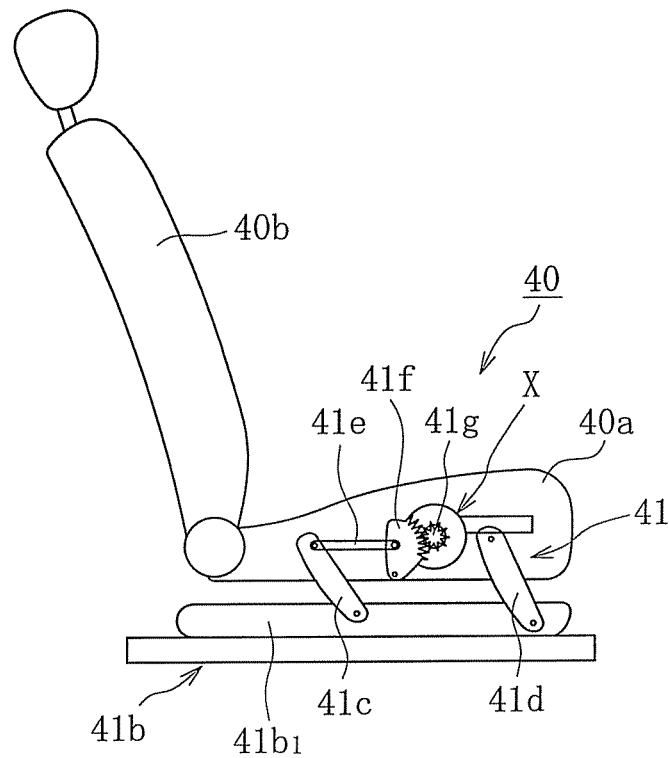
FIG. 27a is a conceptual view of a structural example of a seat lifter section.

FIG. 27a is a conceptual view of a structural example of the seat lifter section 41. One ends of link members 41c and 41d are pivotally attached to a slide movable member $41b_1$ of a seat slide adjuster 41b. The other ends of the link members 41c and 41d are pivotally attached to the sitting seat 40a. The other end of the link member 41c is pivotally attached to a sector gear 41f through intermediation of a link member 41e. The sector gear 41f is pivotally attached to the sitting seat 40a, and rockable about a fulcrum $41f_1$. The other end of the link member 41d is pivotally attached to the sitting seat 40a.

The clutch unit X described above in this embodiment is fixed to an appropriate position of the sitting seat 40a. Fixation to the sitting seat 40a of the clutch unit X is fixation by swaging to a seat frame 40c of the sitting seat 40a, in which the three flange portions 25e and 25f of the brake-side side plate 25 are subjected to plastic deformation in a manner that the distal end portions of the cylindrical portions 25i and 25j are increased in diameter to the outside (refer to FIG. 28).

Meanwhile, the operation lever 41a made of, for example, a resin is coupled to the lever-side sideplate 13 of the lever-side clutch portion 11, and the pinion gear 41g meshing with the sector gear 41f as a rotary member is provided to the output shaft 22 of the brake-side clutch portion 12. As illustrated in FIGS. 1, 14a, and 14b, the pinion gear 41g is integrally formed at distal end portion of a brake-side shaft portion $22c_2$ of the output shaft 22.

Figure 28:
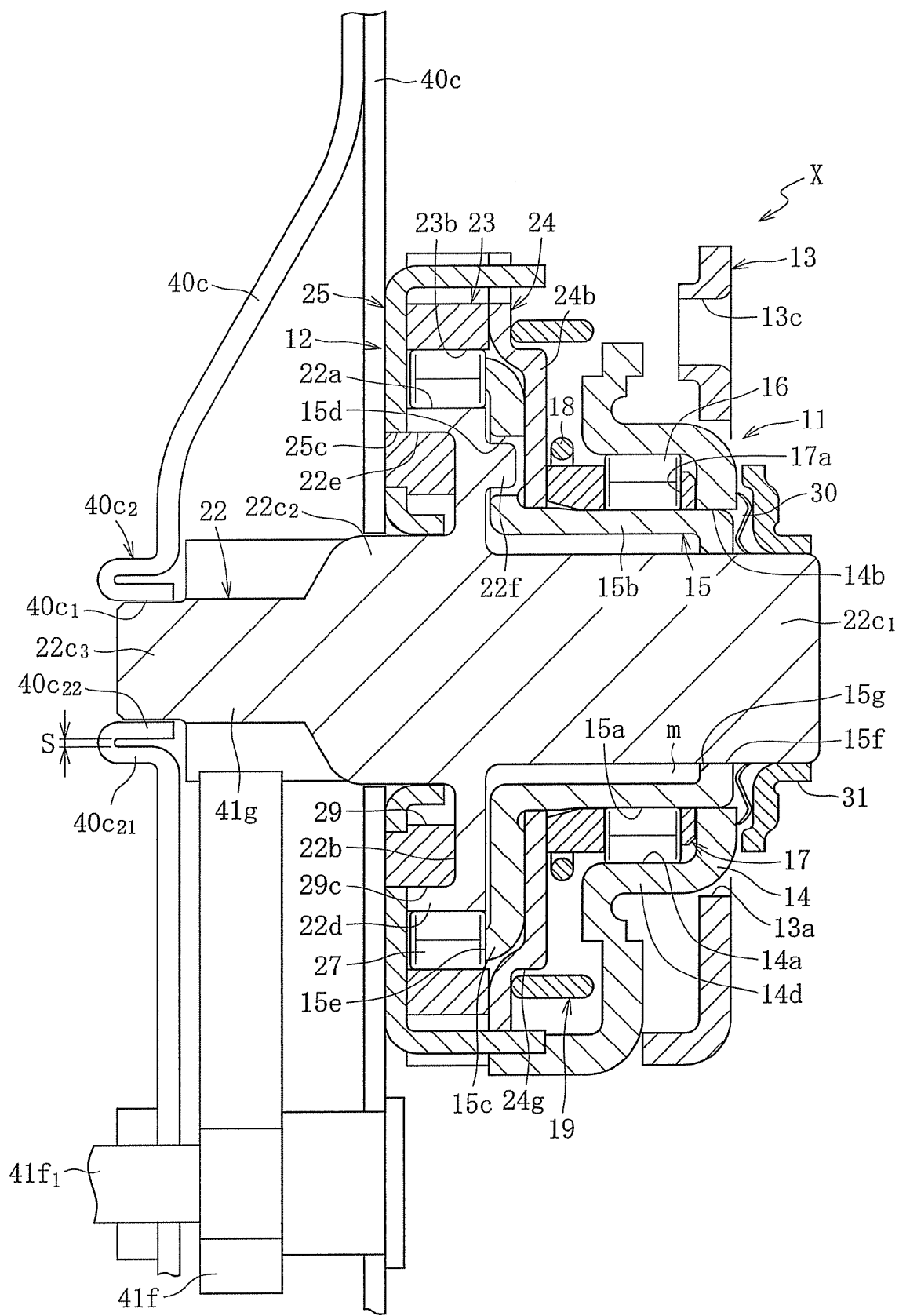
FIG. 28 is a longitudinal sectional view illustrating a state in which the clutch unit (refer to FIG. 1) is assembled to a seat frame of the seat lifter section.

As illustrated in FIG. 28, in the above-mentioned seat frame 40c, a hole $40c_1$ through which a distal end shaft portion $22c_3$ of the output shaft 22 is inserted is formed, and an elastic portion $40c_2$ is formed in a peripheral edge portion of the hole $40c_1$. The elastic portion $40c_2$ is molded by bending the peripheral edge portion of the hole $40c_1$ of the seat frame 40c to an axially outer side and further folding the same to an axially inner side, to thereby be formed into a U-shape. In other words, the elastic portion $40c_2$ includes an outer cylindrical portion $40c_{21}$ and an inner cylindrical portion $40c_{22}$ provided continuously with the outer cylindrical portion $40c_{21}$.

With provision of the elastic portion $40c_2$ as in this case, in the case where the output shaft 22 is rotated about the lever-side shaft portion $22c_1$, even if the brake-side shaft portion $22c_2$ is eccentrically rotated, an eccentric amount of the brake-side shaft portion $22c_2$ is absorbed owing to elastic deformation of the elastic portion $40c_2$. As a result, it is possible to reduce resistance caused by contact between the elastic portion $40c_2$ of the seat frame 40c and the distal end shaft portion $22c_3$ of the output shaft 22, and to suppress an increase in lever operation torque at the lever-side clutch portion 11.

Note that, it is effective that the above-mentioned elastic portion $40c_2$ is thinner than the other portions of the seat frame 40c. When the elastic portion $40c_2$ is thin, the elastic portion $40c_2$ is easily subjected to elastic deformation, and thus it is possible to further reduce the resistance caused by contact between the elastic portion $40c_2$ of the seat frame 40c and the distal end shaft portion $22c_3$ of the output shaft 22. Further, a gap amount s between the outer cylindrical portion $40c_{21}$ and the inner cylindrical portion $40c_{22}$ in the elastic portion $40c_2$ may be set to be equivalent to an estimated eccentric amount of the distal end shaft portion $22c_3$ of the output shaft 22.

Figure 29:
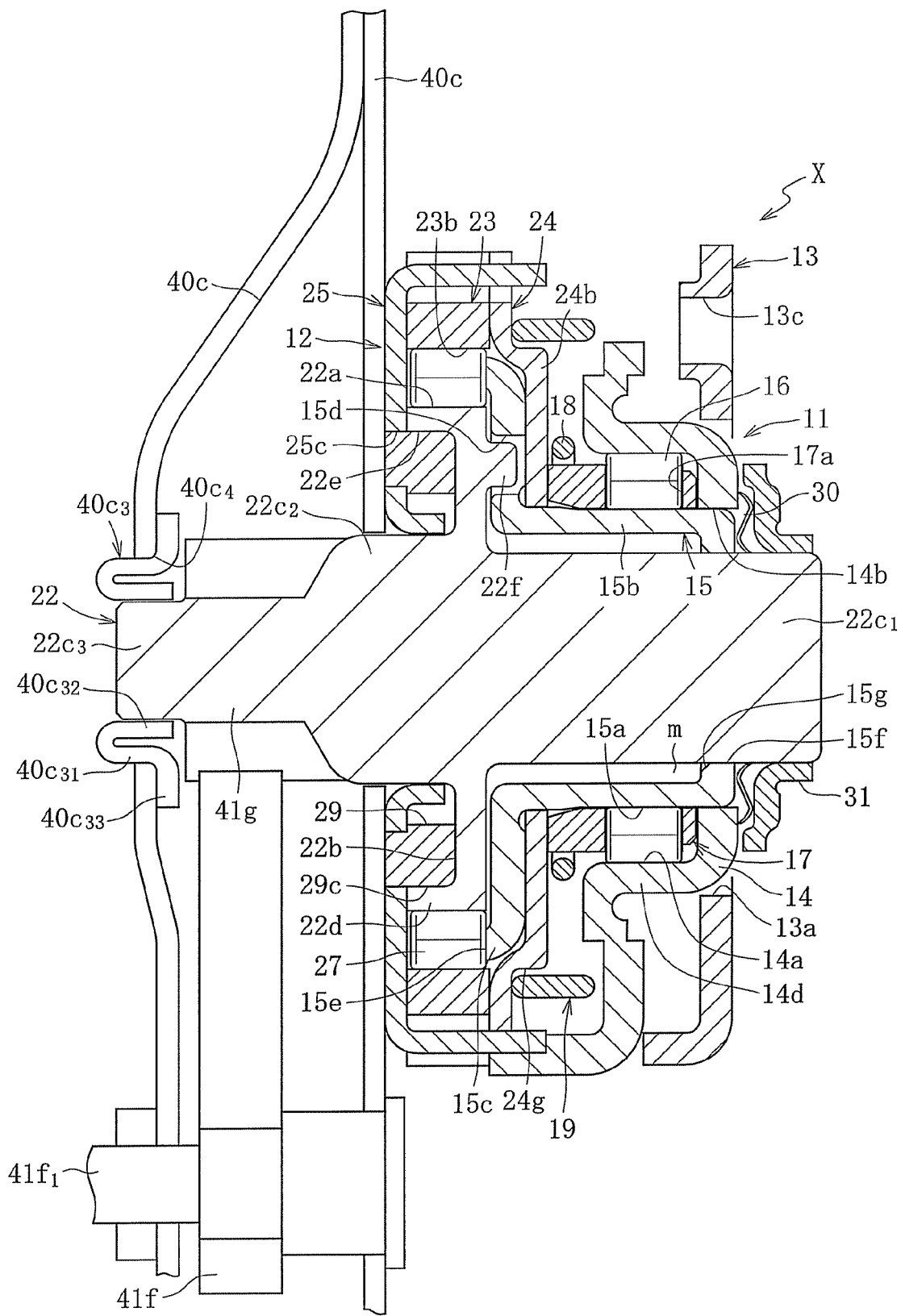
FIG. 29 is a longitudinal sectional view of a modification of the seat frame of the seat lifter section.

Description has been made on the case where the above-mentioned seat frame 40c is provided integrally with the elastic portion $40c_2$. However, as illustrated in FIG. 29, an elastic portion $40c_3$ can be provided separately from the seat frame 40c. The elastic portion $40c_3$ includes an outer cylindrical portion $40c_{31}$, an inner cylindrical portion $40c_{32}$ provided continuously with the outer cylindrical portion $40c_{31}$ by folding one end of the outer cylindrical portion $40c_{31}$ inwardly, and a flange portion $40c_{33}$ provided continuously therewith by bending the other end of the outer cylindrical portion $40c_{31}$ outwardly. The elastic portion $40c_3$ is formed of an iron-based flexible member.

It is possible to mount the elastic portion $40c_3$ through press-fitting the outer cylindrical portion $40c_{31}$ into a hole $40c_4$ of the seat frame 40c or through welding the flange portion $40c_{33}$ onto a peripheral edge portion of the hole $40c_4$ of the seat frame 40c. Note that, the operation and effect of the elastic portion $40c_3$ are equivalent to those of the elastic portion $40c_2$ of FIG. 28, and hence overlapping description is omitted.

Figure 27B:
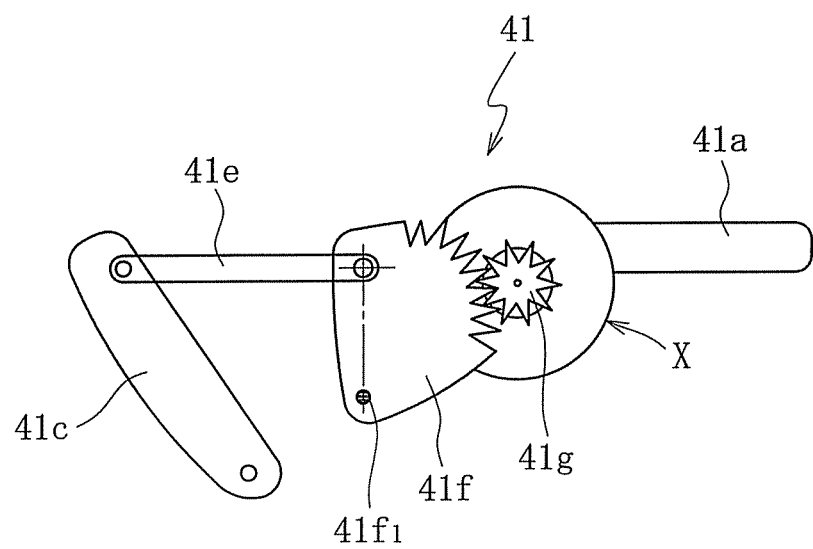

In FIG. 27b, when the operation lever 41a is rock-operated counterclockwise (upward), torque input in that direction is transmitted to the pinion gear 41g through intermediation of the clutch unit X so as to counterclockwise pivot the pinion gear 41g. Then, the sector gear 41f meshing with the pinion gear 41g rocks clockwise so as to pull the other end of the link member 41c through intermediation of the link member 41e. As a result, the link member 41c and the link member 41d stand together, and a seat surface of the sitting seat 40a becomes higher.

In this manner, when the operation lever 41a is released after adjustment of the height H of the sitting seat 40a, the operation lever 41a pivots clockwise with the elastic force of the two centering springs 18 and 19 and returns to the original position (restores to the neutral state). Note that, when the operation lever 41a is rock-operated clockwise (downward), the seat surface of the sitting seat 40a is lowered with operation in an opposite direction as that in the case described above. Further, when the operation lever 41a is released after adjustment of the height, the operation lever 41a pivots counterclockwise and returns to the original position (restores to the neutral state).

The present invention is not limited to the foregoing description in this embodiment. As a matter of course, the present invention may be carried out in various modes without departing from the spirit of the present invention. The scope of the present invention is defined by claims, and includes the meaning of an equivalent of the claims and all the modifications within the claims.

What is claimed is:

1. A clutch unit, comprising:
    a lever-side clutch portion disposed on an input side of the clutch unit, and being configured to control transmission/interruption of rotational torque to an output side of the clutch unit with lever operation; and
    a brake-side clutch portion disposed on the output side of the clutch unit, and being configured to transmit torque input from the lever-side clutch portion to the output side and to interrupt torque reverse-input from the output side, wherein
    the lever-side clutch portion comprises
        an input-side member to which torque is capable of being input with the lever operation,
        a coupling member configured to transmit the torque input from the input-side member to the brake-side clutch portion,
        a plurality of engagement elements configured to control transmission/interruption of the torque input from the input-side member through engagement/disengagement between the input-side member and the coupling member,
        a retainer that is a cylindrical member having a plurality of pockets that are spaced equally apart in a circumferential direction, the plurality of pockets accommodating the plurality of engagement elements, and
        an elastic member including lock portions to be locked to the retainer, and being configured to accumulate an elastic force obtained by the torque input from the input-side member and to restore the retainer to a neutral state by releasing the elastic force obtained by the torque input from the input-side member and thus accumulated,
    an end portion of the retainer has two cutout recessed portions formed therein, each of the two cutout recessed portions having an end surface, the end surfaces of the two cutout recessed portions being adjacent to each other, and hook portions protrude in a circumferential direction from the adjacent end surfaces of the two cutout recessed portions, the hook portions holding the lock portions of the elastic member in contact with the adjacent end surfaces to lock the lock portions of the elastic member.

2. A clutch unit according to claim 1, wherein the elastic member comprises a spring member having a circular shape in cross-section; and the adjacent end surfaces of the two cutout recessed portions of the retainer to be held in contact with the lock portions of the elastic member have an arc-shape in cross-section.

3. A clutch unit according to claim 1, wherein the hook portions protruding from the adjacent end surfaces of the two cutout recessed portions of the retainer have a protruding dimension ⅙ to ⅓ of a wire material diameter of the elastic member.

4. A clutch unit according to claim 1, wherein each of the hook portions includes a chamfered portion at a protruding end of the respective hook portion.

5. A clutch unit according to claim 1, wherein the brake-side clutch portion comprises the coupling member to which the torque from the lever-side clutch portion is capable of being input, and an output-side member rotatably arranged inside the coupling member; and the coupling member includes a bottomed cylindrical portion in which a shaft portion of the output-side member is inserted and arranged; and a hole in a bottom portion of the bottomed cylindrical portion, the hole being formed by punching with a press and through which the shaft portion of the output-side member is rotatably inserted.

6. A clutch unit according to claim 5, wherein the coupling member includes a chamfered portion on an inner peripheral edge portion of the hole in the bottom portion of the bottomed cylindrical portion.

7. A clutch unit according to claim 5, wherein the bottomed cylindrical portion of the coupling member has an inner diameter dimension larger than an outer diameter dimension of the shaft portion of the output-side member.

8. A clutch unit according to claim 1, wherein at least one of engagement elements of the lever-side clutch portion and engagement elements of the brake-side clutch portion comprise cylindrical rollers.

9. A clutch unit according to claim 1, wherein the lever-side clutch portion and the brake-side clutch portion are incorporated in an automobile seat-lifter section.

10. A clutch unit according to claim 9, wherein the input-side member of the lever-side clutch portion is connected to the operation lever, and an output-side member of the brake-side clutch portion is coupled to a link mechanism of the automobile seat-lifter section.

11. A clutch unit according to claim 2, wherein the hook portions protruding from the adjacent end surfaces of the two cutout recessed portions of the retainer have a protruding dimension ⅙ to ⅓ of a wire material diameter of the elastic member.

12. A clutch unit according to claim 2, wherein each of the hook portions includes a chamfered portion at a protruding end of the respective hook portion.

13. A clutch unit according to claim 3, wherein each of the hook portions includes a chamfered portion at a protruding end of the respective hook portion.

14. A clutch unit according to claim 11, wherein each of the hook portions includes a chamfered portion at a protruding end of the respective hook portion.

15. A clutch unit according to claim 6, wherein the bottomed cylindrical portion of the coupling member has an inner diameter dimension larger than an outer diameter dimension of the shaft portion of the output-side member.

* * * * *